(12) United States Patent
Rajakumar

(10) Patent No.: US 12,627,707 B2
(45) Date of Patent: May 12, 2026

(54) MITIGATING RISK FROM MULTI-FACTOR AUTHENTICATION FATIGUE ATTACKS

(71) Applicant: Vercrio, Inc., Wilmington, DE (US)

(72) Inventor: Anthony Rajakumar, Fremont, CA (US)

(73) Assignee: Vercrio, Inc., Wilmington, DE (US)

( * ) Notice: Subject to any disclaimer, the term of this patent is extended or adjusted under 35 U.S.C. 154(b) by 167 days.

(21) Appl. No.: 18/465,853

(22) Filed: Sep. 12, 2023

(65) Prior Publication Data

US 2024/0098113 A1 Mar. 21, 2024

Related U.S. Application Data

(60) Provisional application No. 63/407,578, filed on Sep. 16, 2022.

(51) Int. Cl.
*H04L 9/40* (2022.01)

(52) U.S. Cl.
CPC .......... *H04L 63/1466* (2013.01); *H04L 63/08* (2013.01); *H04L 2463/082* (2013.01)

(58) Field of Classification Search
CPC H04L 63/1466; H04L 63/08; H04L 2463/082
USPC .......................................... 726/23
See application file for complete search history.

(56) References Cited

U.S. PATENT DOCUMENTS

| | | | | |
|---|---|---|---|---|
| 7,516,487 B1* | 4/2009 | Szeto | ................. | H04L 63/0263 726/13 |
| 11,361,062 B1* | 6/2022 | Ogrinz | .................... | G06F 21/40 |

| | | | | |
|---|---|---|---|---|
| 2006/0020816 A1* | 1/2006 | Campbell | ............. | H04L 63/083 713/182 |
| 2006/0146862 A1* | 7/2006 | Lee | ..................... | H04L 63/0272 370/448 |
| 2013/0010317 A1* | 1/2013 | Sai | ........................ | G06F 3/1221 358/1.14 |
| 2015/0195274 A1* | 7/2015 | Lee | ........................ | G06F 21/44 713/156 |

(Continued)

OTHER PUBLICATIONS

Terry, Joshua, "Verified Duo Push Makes MFA More Secure," Duo Blog/Duo Security, https://duo.com/blog/verified-duo-push-makes-mfa-more-secure, Aug. 25, 2022, 4 pages.

*Primary Examiner* — Dant B Shaifer Harriman
(74) *Attorney, Agent, or Firm* — Paradice & Li LLP

(57) ABSTRACT

An authentication system identifies and mitigates the effectiveness of a Multi-factor Authentication (MFA) Fatigue attack. The attack may be detected based on the number of requests for authentication received for a user within a predetermined time window, or through user or administrator input. Once detected, the authentication system is placed in a safe mode to mitigate the MFA Fatigue attack. In safe mode, all pending requests for authentication are automatically rejected. Subsequent requests for mitigation may be automatically rejected or the authentication process may be modified to accurately differentiate authentication attempts from a legitimate user from authentication attempts that are part of the MFA Fatigue attack. To further mitigate the effectiveness of MFA Fatigue attacks, the authentication system may use simulated authentication attempts to identify and train users who are susceptible to MFA Fatigue attacks.

20 Claims, 14 Drawing Sheets

(56)    References Cited

U.S. PATENT DOCUMENTS

| | | | |
|---|---|---|---|
| 2019/0188368 A1* | 6/2019 | Hastings | H04L 63/0492 |
| 2019/0281053 A1* | 9/2019 | Brown | H04W 12/06 |
| 2020/0178065 A1* | 6/2020 | Huber | H04W 76/11 |
| 2020/0226243 A1* | 7/2020 | Manduley | G06F 21/57 |
| 2020/0304484 A1* | 9/2020 | Lakunishok | G06F 21/62 |
| 2022/0158999 A1* | 5/2022 | Kaidi | H04L 63/0884 |
| 2022/0284227 A1* | 9/2022 | Ogrinz | G06V 40/171 |
| 2022/0385656 A1* | 12/2022 | Gujarathi | H04L 63/0876 |
| 2023/0036917 A1* | 2/2023 | Meschiari | G06N 20/00 |
| 2023/0229750 A1* | 7/2023 | Weiner | G06F 21/32 |
| | | | 726/17 |
| 2024/0098113 A1* | 3/2024 | Rajakumar | H04L 63/08 |
| 2024/0314138 A1* | 9/2024 | Tiwari | H04W 12/63 |
| 2024/0353922 A1* | 10/2024 | Dedonato | G06T 13/80 |
| 2025/0080546 A1* | 3/2025 | Aoki | H04L 9/14 |
| 2025/0133072 A1* | 4/2025 | Stone | H04L 63/083 |

* cited by examiner

500

510 — Send request for authentication confirmation to user

520 — Receive user response

530 — Did user indicate they initiated request

Yes

No

540 — Proceed with authentication procedure

550 — Provide indication of MFA Fatigue attack

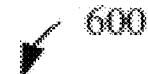
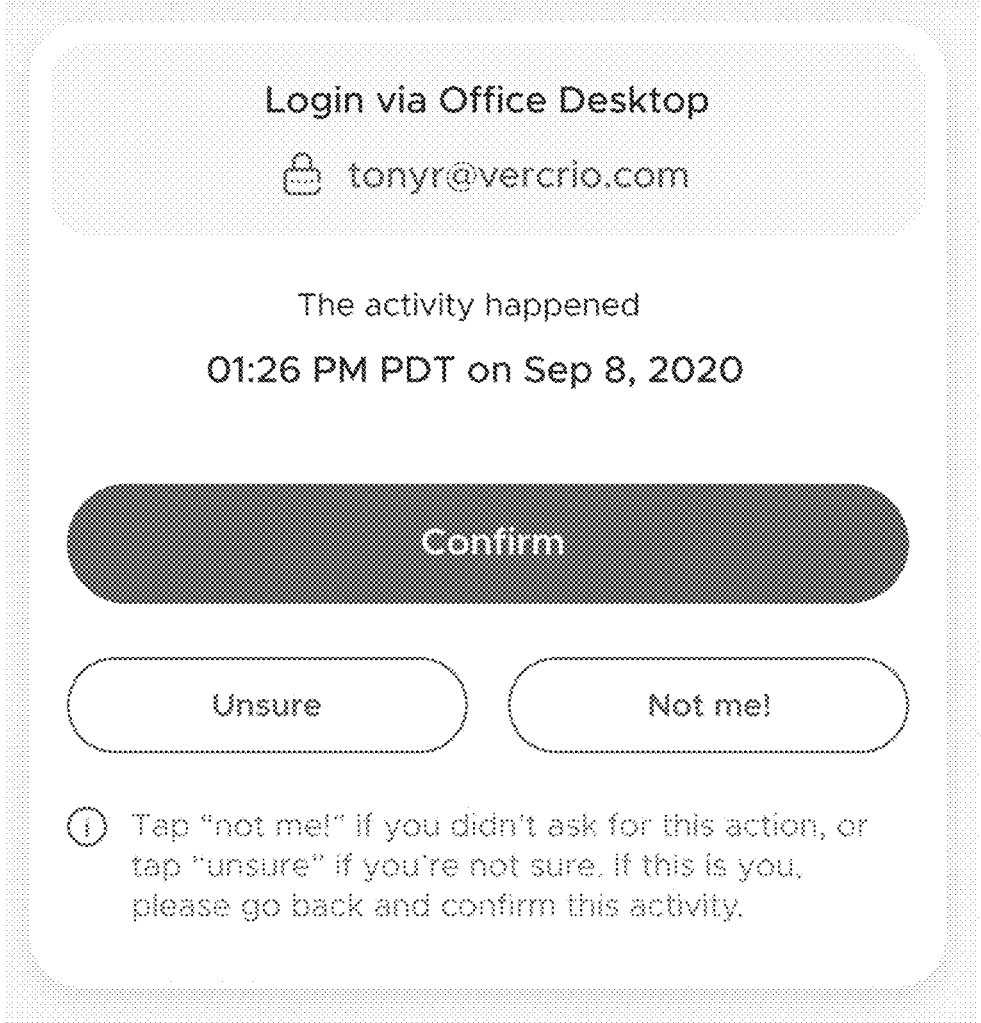
FIG. 6

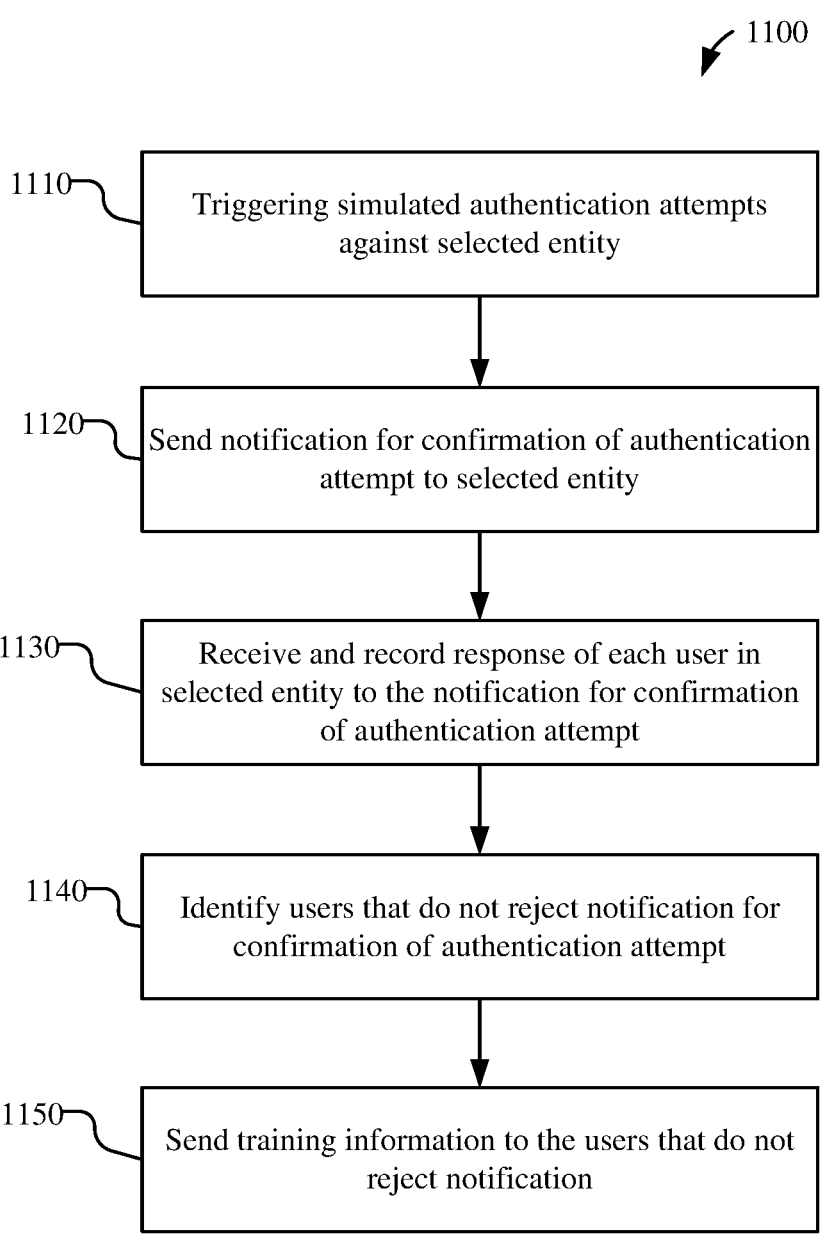

1100

1110 — Triggering simulated authentication attempts against selected entity

1120 — Send notification for confirmation of authentication attempt to selected entity 1130 — Receive and record response of each user in selected entity to the notification for confirmation of authentication attempt 1140 — Identify users that do not reject notification for confirmation of authentication attempt 1150 — Send training information to the users that do not reject notification

FIG. 11

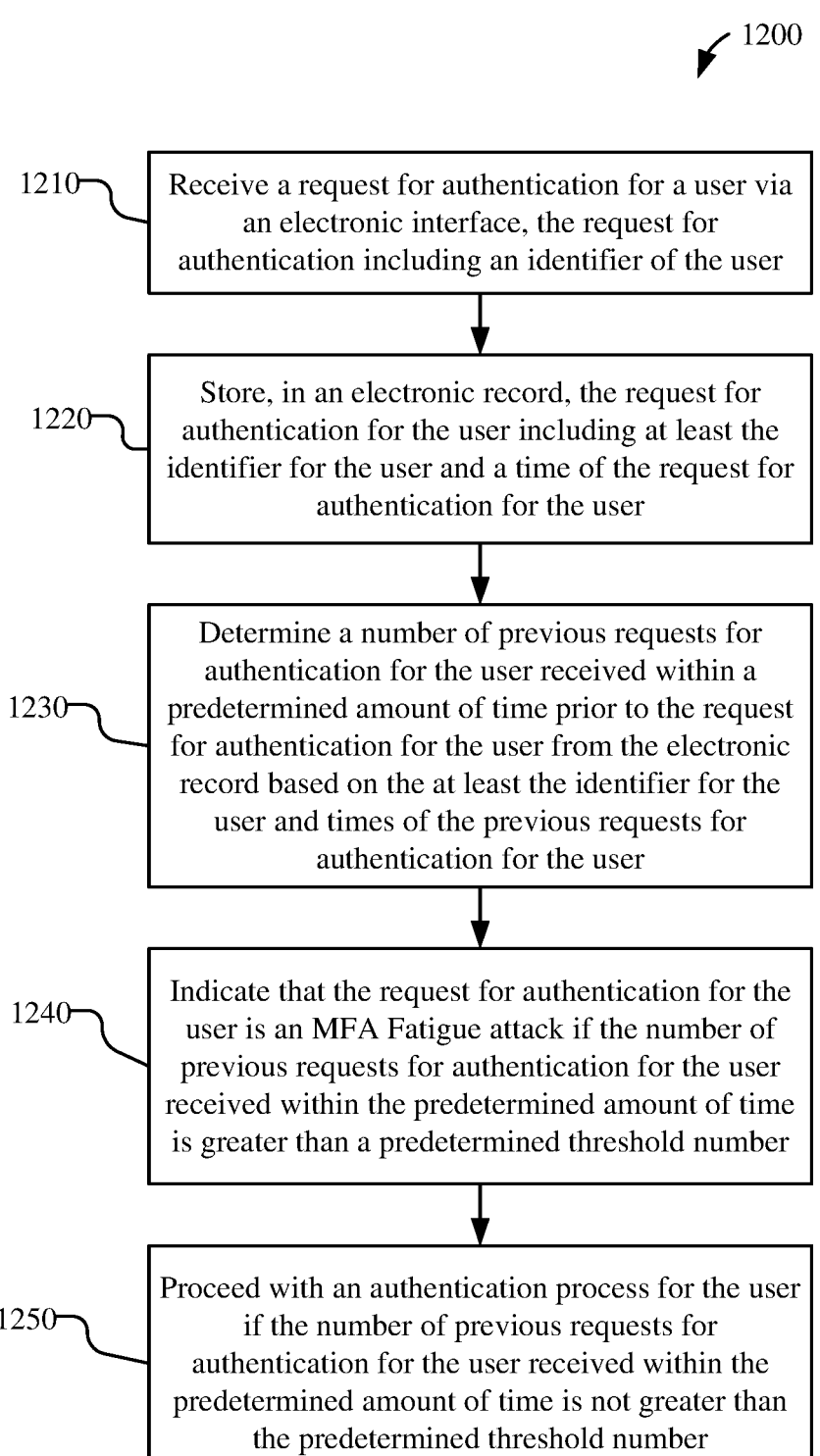

1200

1210 — Receive a request for authentication for a user via an electronic interface, the request for authentication including an identifier of the user 1220 — Store, in an electronic record, the request for authentication for the user including at least the identifier for the user and a time of the request for authentication for the user 1230 — Determine a number of previous requests for authentication for the user received within a predetermined amount of time prior to the request for authentication for the user from the electronic record based on the at least the identifier for the user and times of the previous requests for authentication for the user 1240 — Indicate that the request for authentication for the user is an MFA Fatigue attack if the number of previous requests for authentication for the user received within the predetermined amount of time is greater than a predetermined threshold number 1250 — Proceed with an authentication process for the user if the number of previous requests for authentication for the user received within the predetermined amount of time is not greater than the predetermined threshold number

1310 — Receive one or more requests for authentication for a user using an MFA procedure via an electronic interface 1320 — Receive an indication that at least one of the one or more requests for authentication for the user is an MFA Fatigue attack 1330 — Cancel all pending requests for authentication for the user

MITIGATING RISK FROM MULTI-FACTOR AUTHENTICATION FATIGUE ATTACKS

CROSS REFERENCE TO RELATED APPLICATIONS

This application claims priority under 35 USC § 119 to U.S. Provisional Application No. 63/407,578, filed Sep. 16, 2022, entitled "Mitigating Risk From MFA Fatigue Attacks," which is incorporated by reference herein in its entirety.

BACKGROUND

The use of multiple factors to authenticate a user's access to computer resources, commonly known as Multi-factor Authentication (MFA), has become widespread. Phone-based authentication applications, e.g., apps, such as Duo or Microsoft Authenticator, for example, are often used as part of an MFA system. In such an MFA system, the first factor is often a password and the second factor is a notification triggered to the authentication app on the user's phone, to which the user must respond affirmatively in order for the system to grant access. Thus, the authentication is a two-step process: the user enters their password into a web page, and if it matches, the system sends a push notification to the authentication app. If the user responds affirmatively to this notification on the user's phone, then access is granted.

Attackers have formulated a new method to compromise such MFA systems and gain unauthorized access. The first step in the attack involves the compromise of passwords (through phishing, for example). Using the stolen password, the attacker may trigger repeated simultaneous authentication attempts. The repeated authentication attempts by the attacker trigger multiple confirmation notifications being pushed to the actual user's phone-based app. The actual user, of course, should respond to each of these notifications negatively. However, when faced with a flood of confirmation notifications to their authentication app, users may get fatigued with the repeated notifications and may be tempted to respond affirmatively, simply to silence the system. Only one affirmative response is needed for the attacker to gain control of the user's account, and, accordingly, a single affirmative response made by the actual user to silence the system allows the attacker to access the account. This attack is termed an MFA Fatigue attack and may be a serious compromise to an organization's security. For example, if multiple members of an organization, e.g., employees of a business, are attacked in this manner, a single affirmative response from a single employee during an MFA Fatigue attack may allow an attacker to access the organization's accounts.

SUMMARY

An automated process is disclosed for improving the functionality of computer systems to mitigate the effectiveness of MFA Fatigue attacks. An authentication system may identify an MFA Fatigue attack automatically based on a number of requests for authentication that are received for a user within a predetermined time window, or through user or administrator input. Once detected, the authentication system may place the authentication system into a safe mode to mitigate the MFA Fatigue attack. While in safe mode, all pending requests for authentication are automatically rejected by the authentication system. Additionally, subsequent requests for authentication may be automatically rejected or the authentication process may be modified to accurately differentiate authentication attempts from a legitimate user from authentication attempts that are part of the MFA Fatigue attack. To further mitigate the effectiveness of MFA Fatigue attacks, the authentication system may use simulated authentication attempts to identify users who are susceptible to MFA Fatigue attacks who may be trained accordingly, or may be switched to a different type of authentication procedure that is not at risk to MFA Fatigue attacks.

In one implementation, a method for detecting a Multi-Factor Authentication (MFA) Fatigue attack includes receiving an attempt at authentication attempt at authentication for a user via an electronic interface, the attempt at authentication comprising an identifier of the user and storing, in an electronic record, the attempt at authentication for the user including at least the identifier for the user and a time of the attempt at authentication for the user. The method includes determining a number of previous attempts at authentication for the user received within a predetermined amount of time prior to the attempt at authentication for the user from the electronic record based on the at least the identifier for the user and times of the previous attempts at authentication for the user; indicating that the attempt at authentication for the user is an MFA Fatigue attack if the number of previous attempts at authentication for the user received within the predetermined amount of time is greater than a predetermined threshold number; and proceeding with an authentication process for the user if the number of previous attempts at authentication for the user received within the predetermined amount of time is not greater than the predetermined threshold number.

In one implementation, an authentication server for detecting a Multi-Factor Authentication (MFA) Fatigue attack includes at least one memory; and a processing system comprising one or more processors coupled to and the at least one memory. The processing system is configured to receive a request for authentication for a user via an electronic interface, the request for authentication comprising an identifier of the user; and store, in an electronic record, the request for authentication for the user including at least the identifier for the user and a time of the request for authentication for the user. The processing system is further configured to determine a number of previous requests for authentication for the user received within a predetermined amount of time prior to the request for authentication for the user from the electronic record based on the at least the identifier for the user and times of the previous requests for authentication for the user; indicate that the request for authentication for the user is an MFA Fatigue attack if the number of previous requests for authentication for the user received within the predetermined amount of time is greater than a predetermined threshold number; and proceed with an authentication process for the user if the number of previous requests for authentication for the user received within the predetermined amount of time is not greater than the predetermined threshold number.

In one implementation, a method for mitigating a Multi-Factor Authentication (MFA) Fatigue attack includes receiving one or more attempts at authentication for a user using an MFA procedure via an electronic interface, and receiving an indication that at least one of the one or more attempts at authentication for the user is an MFA Fatigue attack. The method includes rejecting all pending attempts at authentication for the user.

In one implementation, an authentication server for mitigating a Multi-Factor Authentication (MFA) Fatigue attack includes at least one memory; and a processing system comprising one or more processors coupled to and the at least one memory. The processing system is configured to receive one or more requests for authentication for a user using an MFA procedure via an electronic interface and receive an indication that at least one of the one or more requests for authentication for the user is an MFA Fatigue attack. The processing system is further configured to reject all pending requests for authentication for the user.

In one implementation, a method for training users for a Multi-Factor Authentication (MFA) Fatigue attack includes selecting one or more users, sending simulated requests for confirmation of authentication attempts to respective devices associated with each of the one or more users, the simulated requests for confirmation of authentication attempts being unsolicited by the one or more users; and receiving responses to the simulated requests for confirmation of authentication attempts from each of the one or more users. The method includes storing the responses to the simulated requests for confirmation of authentication attempts from each of the one or more users; identifying users who do not reject the simulated requests for confirmation of authentication attempts; and sending training information to the users who do not reject the simulated requests for confirmation of authentication attempts.

In one implementation, an authentication server for training users for a Multi-Factor Authentication (MFA) Fatigue attack, includes at least one memory; and a processing system comprising one or more processors coupled to and the at least one memory. The processing system is configured to select one or more users, and send simulated requests for confirmation of authentication attempts to respective devices associated with each of the one or more users, the simulated requests for confirmation of authentication attempts being unsolicited by the one or more users; and receive responses to the simulated requests for confirmation of authentication attempts from each of the one or more users. The processing system is further configured to store the responses to the simulated requests for confirmation of authentication attempts from each of the one or more users; identify users who do not reject the simulated requests for confirmation of authentication attempts; and send training information to the users who do not reject the simulated requests for confirmation of authentication attempts.

BRIEF DESCRIPTION OF DRAWINGS

FIG. 6 illustrates a request for authentication confirmation that may be presented to the user via the display of a confirming device.

FIG. 11 is a flow chart illustrating an implementation of a method of identifying users who are susceptible to MFA Fatigue attacks.

FIG. 12 is a flow chart illustrating a method for detecting a MFA Fatigue attack, in accordance with an implementation discussed herein.

DETAILED DESCRIPTION

Figure 1:
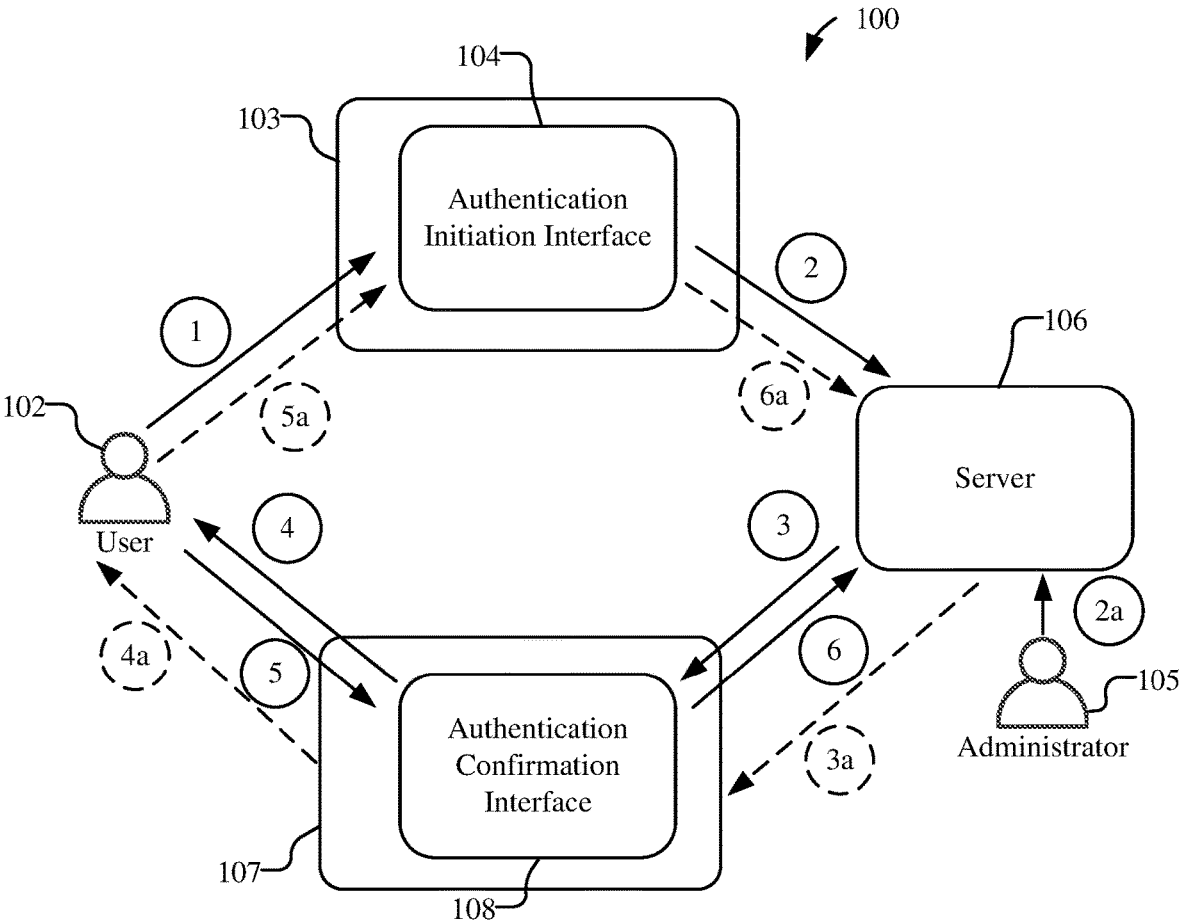
FIG. 1 is a diagram illustrating an authentication system that may use MFA procedures.

Multi-factor authentication (MFA) is an electronic authentication method used to provide a user with access to an account, website, application, etc., after the user successfully presents multiple pieces of evidence (or factors) to an authentication system. For example, a user may be required to enter a password as one factor, and may be required to enter a code sent to their email or answer a secret question as a second factor. The use of multiple forms of authentication provides an additional layer of security to protect digital assets and helps prevent unauthorized access to digital assets even if the user's password has been compromised. An organization, such as a business, may use multi-factor authentication to validate user identities and provide quick and convenient access to authorized users.

The use of MFA provides additional security to protect digital assets, but there is a trade-off, however, between security and convenience of the user. For example, one type of MFA system uses a third-party authenticator app that provides a randomly generated and frequently changing code that is entered by the user as a second factor. The requirement for the user to obtain the code from the third-party authenticator app, however, is somewhat inconvenient for the user, but provides good security. A more convenient procedure for MFA may push a notification for confirmation of authentication attempt to a third-party authenticator app on a device associated with the user, and the user may simply click a button in response. For example, the user may initiate an authentication attempt by logging into an account via a browser on an initiating device, such as the user's computer, and the authentication system may push a notification for confirmation of authentication attempt to a third-party authenticator app on a confirming device associated with the user, such as the user's mobile phone. The user may simply click an "accept" button presented by on the confirming device as the second authentication factor in order to complete the login on the initiating device.

Pushing a notification for confirmation of authentication attempt to a confirming device associated with the user provides a convenient authentication experience for the user, however, attackers may compromise this MFA procedure through an MFA Fatigue attack. In an MFA Fatigue attack, once the user's password has been compromised, the attacker may use the stolen password to initiate repeated simultaneous authentication attempts. Each authentication attempt results in a confirmation notification being pushed to the user's confirming device. The user, of course, should reject each confirmation notification. Users, however, may sometimes become confused or otherwise fatigued from the repeated confirmation notifications received on the confirming device and may incorrectly accept a confirmation notification, thereby allowing the attacker to access the user's account.

As discussed herein, an authentication system may identify an MFA Fatigue attack and take appropriate measures to mitigate the attack. The authentication system, for example, may identify an MFA Fatigue attack against a user based on a system system-initiated detection process, a user-initiated detection process, or an administrator-initiated detection process. In a system-initiated detection process, the authentication system may identify an MFA Fatigue attack based on the number of requests for authentication for the user that are received by the authentication system within a predetermined time window. If multiple requests for authentication for a user are received within a short period of time, for example, it is likely that an MFA Fatigue attack is occurring and the authentication system may take appropriate steps. In a user-initiated detection process or administrator-initiated detection process, the authentication system may identify an MFA Fatigue attack based on reporting from the user or administrator.

Once an MFA Fatigue attack is identified, the risk from MFA Fatigue type attacks may be mitigated by placing the authentication system in a safe mode. In safe mode, the authentication system may resolve an ongoing MFA Fatigue attack, once detected, by automatically rejecting (or cancelling) all pending notifications for confirmation of authentication attempt that have been sent to the user. By automatically rejecting all pending confirmation notifications, the authentication system is no longer relying on the user to reject the confirmation notification. In some implementations, the authentication system may prevent any further authentication attempts until the MFA Fatigue attack is resolved, e.g., after a predetermined amount of time or through administrator intervention. It is desirable, however, for legitimate users to be able to access accounts even if the authentication is in safe mode. Accordingly, in some implementations, while in safe mode, the authentication system may modify the MFA procedure to require that the user confirm (prove) that the initiating device of an authentication attempt is in possession of the legitimate user.

Additionally, the authentication system may train users to withstand future MFA Fatigue attacks. The authentication system, for example, may identify users who are vulnerable to MFA Fatigue attacks using simulated authentication attempts in which one or more simulated notifications for confirmation of the authentication attempt are sent to users to test the users' responses. As the users did not initiate the simulated authentication attempts, each notification for confirmation of the authentication attempt should be rejected by the users. Users that fail to correctly reject the notification for confirmation of the authentication attempt may be identified as being more susceptible to MFA Fatigue attacks and may receive training to improve their resilience to such attacks. The simulated authentication attempts may be repeated over time, and in particular repeated for users who incorrectly respond to the simulated authentication attempts until the users can correctly respond. In some implementations, users that are identified as being vulnerable to MFA Fatigue attacks may be switched to a different type of authentication procedure that is not at risk to MFA Fatigue attacks, such as by placing the authentication procedure in in safe mode.

It should be understood that examples of the authentication process or request for authentication is sometimes described herein as a user login for the sake of simplicity. The use of "authentication" herein, however, is not limited to only user login. Unless indicated otherwise, the term "authentication" should be broadly construed to include wherever a user's identity is to be confirmed, e.g., on a computer network, before the user can be granted access to certain physical or virtual resources, can take certain actions that require authorization, or can confirm an action taken.

FIG. 1 is a diagram illustrating an authentication system 100 that may use MFA procedures. The authentication system 100 is illustrated performing a default MFA procedure in which, e.g., a notification for confirmation of authentication attempt is pushed to a confirming device 107 associated with a user 102 in response to a request for authentication received from an initiating device 103. The authentication system 100, or elements thereof, may be configured to perform any of the detection of MFA Fatigue attacks, mitigation of active and future MFA Fatigue attacks, and identification and training of users who are susceptible to MFA Fatigue attacks, in accordance with implementation discussed herein.

As illustrated at step 1, a user 102 may initiate an attempt at authentication using an initiating device 103 to login to an account, website, application, etc. The initiating device 103, for example, may be an electronic device, such as a computer, laptop, mobile phone, smart phone, tablet, or other electronic system. The attempt at authentication may be initiated, for example, by the user 102 entering a user name, e.g., an email address, and password or other authenticating factor into the initiating device 103 to login to access the desired electronic asset, e.g., account, website, application, etc. The attempt at authentication may be received by or entered into an Authentication Initiation Interface (AII) 104 in the initiating device 103. In some implementations, the Authentication Initiation Interface 104 may be configured to verify the identity of the user 102, based on biometrics, such as fingerprint or facial recognition, or a password, Personal Identification Number (PIN). In some implementations, the initiation of the attempt at authentication may also or alternatively be an implicit initiation, such as when user 102 enters a physical area and the initiating device 103 associated with the user 102 is electronically detected as having entered the specific area.

At step 2, the initiating device 103, e.g., the Authentication Initiation Interface (AII) 104, sends a request for authentication for the user to a computer system for authentication, e.g., server 106 that may sometimes be referred to as an authentication server, that is responsible for orchestrating various system components and data resources to authenticate a user's identity electronically, e.g., based on the user name, user's email address, mobile phone identifier, or other identifier, and password or other authenticating factor that the user entered into the initiating device 103. The server 106, for example, may check a database to determine whether the user 102 is part of a directory of an organization, whether the user 102 is currently deemed active, and whether the user 102 has the rights to complete the authentication. As discussed herein, the server 106 may perform a system-initiated detection process to determine if the request for authentication for the user 102 is an MFA Fatigue attack, as discussed herein. Additionally, as illustrated by step 2a, an administrator 105 may contact the server 106, e.g., via computer interface (portal, web, mobile, etc.), and provide an indication that the user 102, or a group of users that include the user 102, including an entire organization, is undergoing an MFA Fatigue attack in an administrator-initiated detection process.

At step 3, if there is no indication of an MFA Fatigue attack, e.g., determined by a system-initiated detection process or an administrator-initiated detection process, the server 106 contacts a confirming device 107 associated with the user 102 to push a notification for confirmation of authentication attempt. The confirming device 107, for example, may be an electronic device, such as a computer, laptop, mobile phone, smart phone, tablet, or other electronic system that is registered with the server 106 as being associated with the user 102. The confirming device 107 is generally a different device than the initiating device 103. For example, the initiating device 103 may be a computer and the confirming device 107 may be a smart phone associated with the user 102. In some implementations, however, the initiating device 103 and the confirming device 107 may be the same device. The notification for confirmation of authentication attempt may be received by an Authentication Confirmation Interface (ACI) 108 in the confirming device 107. The Authentication Confirmation Interface 108 may be, or may be part of, an authentication application or app on the confirming device 107 for example. In some implementations, the Authentication Confirmation Interface 108 may be configured to verify the identity of the user 102, based on biometrics, such as fingerprint or facial recognition, or a password, Personal Identification Number (PIN).

If there is an indication of an MFA Fatigue attack, the server 106 may place the authentication system in safe mode and may cancel any pending attempts at authentication (such as the attempt at authentication from steps 1 and 2). The server 106 may further prevent any subsequent attempts at authentication until the MFA Fatigue attack is resolved. In some implementations, the server 106 may modify the authentication procedure for subsequent attempts at authentication, as discussed herein. For example, the server 106 may modify the authentication procedure to require verification that the initiating device 103 is in possession of the user 102, as discussed herein.

At step 4, if there is no indication of an MFA Fatigue attack, the confirming device 107, e.g., the Authentication Confirmation Interface 108, may present a request for authentication confirmation to the user 102, e.g., via a display or other communication mechanism. The request for authentication confirmation presented to the user 102, for example, may include buttons (virtual buttons) that allow the user 102 to confirm that the user 102 initiated the attempt at authentication (accept), deny the user initiated the attempt at authentication (reject), and, in some implementations, indicate the user is unsure if the user initiated the attempt at authentication (unsure).

At step 5, the user 102 responds to the request for authentication confirmation from the confirming device 107, e.g., by selecting the appropriate button. In the present example, because the user 102 initiated the attempt at authentication at step 1, the user 102 should select the accept button confirming that the user initiated the attempt at authentication. If, however, the user 102 did not initiate the attempt at authentication (e.g., if an attacker initiated the attempt at authentication based on the user's compromised user name and password) or if the user 102 is not sure whether they initiated the attempt at authentication, the user

102 should select the reject button denying that they initiated the attempt at authentication or the unsure button indicating that they are unsure whether they initiated the attempt at authentication, thereby indicating that there is an MFA Fatigue attack in a user-initiated detection process, as discussed herein.

At step 6, the confirming device 107, e.g., the Authentication Confirmation Interface 108, provides the user response to the server 106, which can then either approve or deny the request for authentication received at step 2, accordingly.

If there is an indication of an MFA Fatigue attack, and the server 106 modified the authentication procedure to require verification that the initiating device 103 is in possession of the user 102, the server 106 may generate an identification prompt, such as a secret code or visual code that encodes information. In step 3a, illustrated with dotted lines, the server 106 may send the identification prompt to the confirming device 107 in place of the notification for confirmation of authentication attempt in step 3. In step 4a, illustrated with dotted lines, the identification prompt may be provided to the user 102 instead of the request for authentication confirmation in step 4. In some implementations, the user 102 may be required to verify their identity, based on biometrics, such as fingerprint or facial recognition, or a password or PIN, on the confirming device 103, before the identification prompt is provided to the user 102. The user 102 may be instructed, e.g., by the confirming device 107 and/or the initiating device 103, to enter an identification response in the initiating device 103. In step 5a, illustrated with dotted lines, instead of responding to a request for authentication confirmation by selecting a button in step 5, the user 102 provides information from the identification prompt from the confirming device 107 to the initiating device 103, e.g., the Authentication Initiation Interface 104. For example, if the initiation prompt is a secret code or visual code, the user 102 may enter the secret code or cause the initiating device to capture an image of the visual code. In some implementations, the user 102 may be required to verify their identity, based on biometrics, such as fingerprint or facial recognition, or a password or PIN, on the initiating device 103 before the user 102 may enter the identification response. In step 6a, illustrated with dotted lines, the initiating device 103, e.g., the Authentication Initiation Interface 104, provides information from the identification response to the server 106. The server 106 may verify that the information from the identification response received from the initiating device 103 received at step 6a corresponds to the identification prompt sent at step 3a, thereby confirming that the user 102 is in possession of the initiating device 103 and, if so, may approve the request for authentication and otherwise may reject the request for authentication.

It should be understood that steps 3a to 6a illustrate one implementation of a modification of the authentication procedure, but other modifications may be implemented. For example, if desired, the identification prompt may be sent to the initiating device 103, e.g., the Authentication Initiation Interface 104, and the user 102 may provide the identification response to the confirming device 107, e.g., the Authentication Confirmation Interface 108. In another implementation, the server 106 may send a request for verification of user identity to the initiating device 103, e.g., the Authentication Initiation Interface 104, and the user 102 may be required to verify their identity, based on biometrics, such as fingerprint or facial recognition, or a password, or PIN, on the initiating device 103. Once verified, the initiating device 103 may provide confirmation of the user's identity to the server 106, thereby confirming that the user 102 is in possession of the initiating device 103 and the server 106 may approve the request for authentication accordingly. In such implementation, e.g., in which the initiating device 103 verifies the user identity, the initiating device 103 functions as both the initiating device and the confirming device 103.

Figure 2:
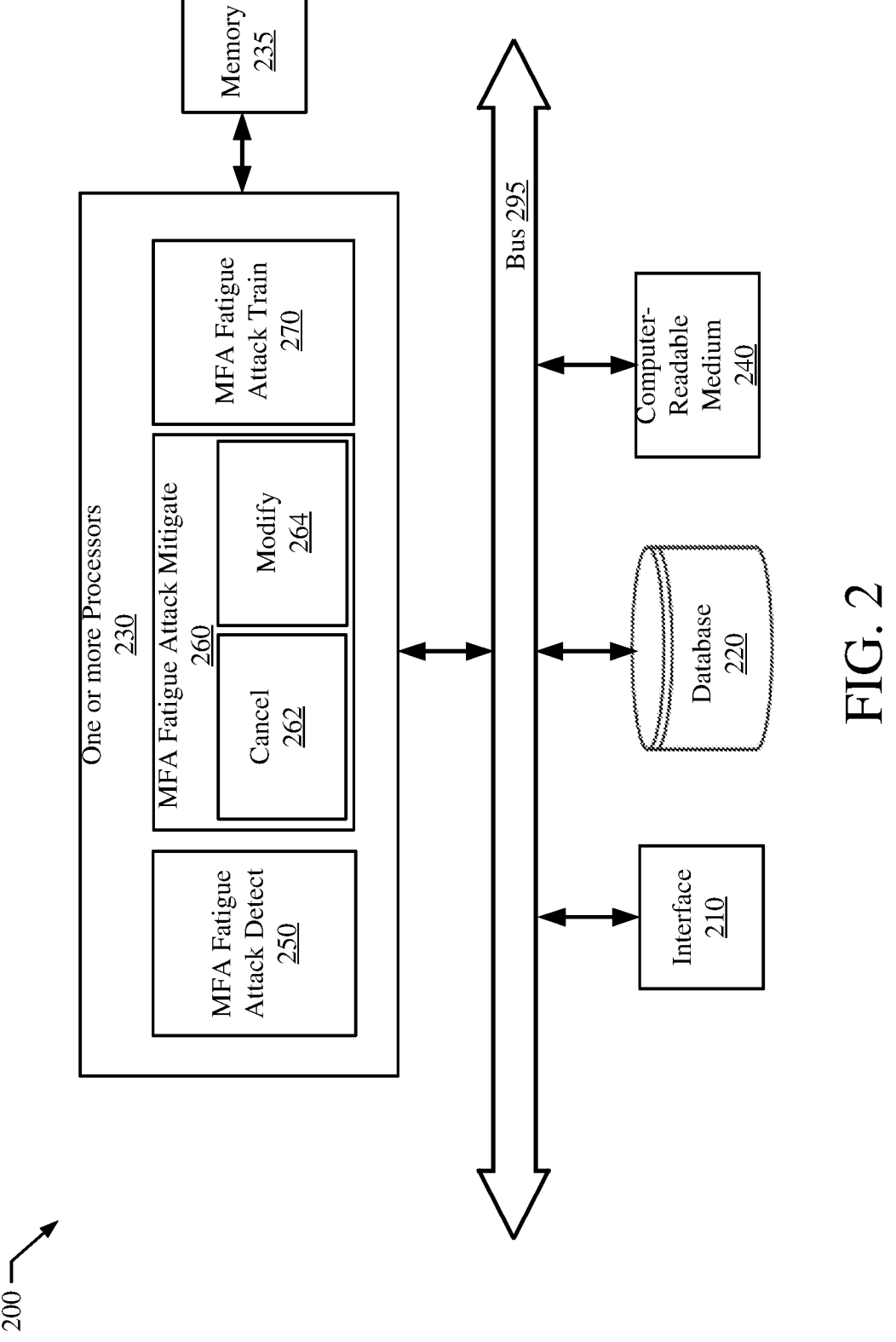
FIG. 2 shows an example computer system that may operate as an authentication server and may be configured for detecting, mitigating and resolving an MFA attack and may be configured for identifying and training users that are vulnerable to MFA attacks.

FIG. 2 shows an example computer system 200 that may operate as server 106 for the authentication system 100 shown in FIG. 1, and may be configured for detecting, mitigating and resolving an MFA attack and may be configured for identifying and training users that are vulnerable to MFA attacks, according to implementations discussed herein. The computer system 200 is shown to include an interface 210, a database 220, one or more processors 230, a memory 235 coupled to the one or more processors 230, and computer-readable medium 240. In some implementations, the various components of the computer system 200 may be interconnected by at least a data bus 295, which may be any known internal or external bus technology, including but not limited to ISA (Industry Standard Architecture), EISA (Extended Industry Standard Architecture), PCI (Peripheral Component Interconnect), PCI Express, NuBus, USB (Universal Serial Bus), Serial ATA (Serial Advanced Technology Attachment), or FireWire. In other implementations, the various components of the computer system 200 may be interconnected using other suitable signal routing resources, for example, the components may be distributed among multiple physical locations and coupled by a network connection.

The computer system 200 may be configured to automatically detect an MFA Fatigue attack, e.g., either through a system-initiated detection process, user-initiated detection process, or administrator-initiated detection process as discussed herein, e.g., in FIGS. 4-7. The computer system 200 may be configured to mitigate and resolve a detected MFA Fatigue attack as discussed herein, e.g., in FIGS. 8-10. The computer system 200 may be configured to identify and train users who are susceptible to MFA Fatigue attacks as discussed herein, e.g., in FIG. 11.

The computer system 200 may communicate, via the interface 210, with multiple users via initiating devices, e.g., through the Authentication Initiation Interface 104 in each initiating devices 103 shown in FIG. 1, and/or confirming devices, e.g., through the Authentication Confirmation Interface 108 in confirming device 107 shown in FIG. 1. The computer system 200 may further communicate with an administrator, e.g., administrator 105 shown in FIG. 5. The interface 210 may be one or more input/output (110) interfaces to communicate with users (such as via a web portal for a remote system or user interface devices for a local system) and administrators. For example, the computer system 200 may communicate, via the interface 210, with multiple users via initiating devices, e.g., through the Authentication Initiation Interface 104 in each initiating devices 103 shown in FIG. 1, and/or confirming devices, e.g., through the Authentication Confirmation Interface 108 in confirming device 107 shown in FIG. 1. The computer system 200 may further communicate with an administrator, e.g., administrator 105 shown in FIG. 1. An example interface 210 may include a wired interface or wireless interface to the internet or other means to communicably couple with other devices. For example, the interface 210 may include an interface with an ethernet cable or a wireless interface to a modem, which is used to communicate with an internet service provider (ISP) directing traffic to and from other devices (if computer system 200 is remote). If the computer system 200 is local, the interface 210 may include a display, a speaker, a mouse, a keyboard, or other suitable input or output elements that allow interfacing with an administrator.

The database 220 may store data, including login information for users, as well as data generated in the authentication processes as discussed herein.

The one or more processors 230 may include one or more suitable processors capable of executing scripts or instructions of one or more software programs stored in computer system 200 (such as within the computer-readable medium 240 and/or memory 235). For example, the one or more processors 230 may be capable of executing one or more of the applications. The one or more processors 230 may include a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof that may be configured via hardware, software, or firmware to operate as special purpose processors to perform the functions described herein. For example, the one or more processors 230 may configured to operate as any of an MFA Fatigue Attack detect processor 250 to perform functions as discussed in FIGS. 4-7, an MFA Fatigue Attack Mitigate processor 260 to perform functions as discussed in FIGS. 8-10, and an MFA Fatigue Attack train processor 270 to perform functions as discussed in FIG. 11. In one or more implementations, the one or more processors 230 may include a combination of computing devices (such as a combination of a DSP and a microprocessor, a plurality of microprocessors, one or more microprocessors in conjunction with a DSP core, or any other such configuration). In some implementations, particular processes and methods may be performed by circuitry that is specific to a given function.

The memory 235 may be any memory (such as RAM, flash, etc.) that temporarily or permanently stores data, such as any number of software programs, executable instructions, machine code, algorithms, and the like that can be executed by the one or more processors 230 to perform one or more corresponding operations or functions. In some implementations, the memory 235 may be connected directly to or integrated with the one or more processors 230, e.g., as a processing in memory (PIM) chip.

Computer-readable medium 240 may be any computer-readable medium that participates in providing instructions to the one or more processors 230, directly or via memory 235, for execution, including without limitation, non-volatile storage media (e.g., optical disks, magnetic disks, flash drives, etc.), or volatile media (e.g., SDRAM, ROM, etc.). In some implementations, hardwire circuitry may be used in place of, or in combination with, software instructions to implement aspects of the disclosure. As such, implementations of the subject matter disclosed herein are not limited to any specific combination of hardware circuitry and/or software.

Computer-readable medium 240 may include various instructions, such as instructions for implementing an operating system (e.g., Mac OS®, Windows®, Linux, etc.). The operating system may be multi-user, multiprocessing, multitasking, multithreading, real-time, and the like. The operating system may perform basic tasks, including but not limited to recognizing input data from input devices via the interface 210, sending output data to devices via the interface 210, keeping track of files and directories on computer-readable medium 240, controlling peripheral devices (e.g., disk drives, printers, etc.) which can be controlled directly or through an I/O controller, and managing traffic on bus 295. Computer-readable medium 240 may further include network communications instructions to establish and maintain network connections via the interface 210 (e.g., software for implementing communication protocols, such as TCP/IP, HTTP, Ethernet, telephony, etc.).

As illustrated, the one or more processors 230 is configured to perform various functions, as discussed herein. For example, the one or more processors 230 may be configured to operate as an MFA Fatigue Attack detect processor 250 to perform functions, such as those discussed in FIGS. 4-7. For example, the one or more processors 230 may be configured to identify an MFA Fatigue attack, e.g., based on a system system-initiated detection process, a user-initiated detection process, or an administrator-initiated detection process. In the system-initiated detection process, the one or more processors 230 may be configured to identify an MFA Fatigue attack based on a number of requests for authentication for the user that are initiated within a predetermined time window, e.g., where multiple requests for authentication for a user initiated within a predetermined time window may indicate an MFA Fatigue attack. In a user-initiated detection process, the one or more processors 230 may be configured to identify an MFA Fatigue attack based on input received from a user via the interface 210. In an administrator-initiated detection process, the one or more processors 230 may be configured to identify an MFA Fatigue attack based on input received from an administrator via the interface 210. When the one or more processors 230 identifies an MFA Fatigue attack, it may provide an indication that an MFA Fatigue attack is occurring, e.g., by setting an attack flag or adjusting a score in memory 235 or database 220.

Figure 8:
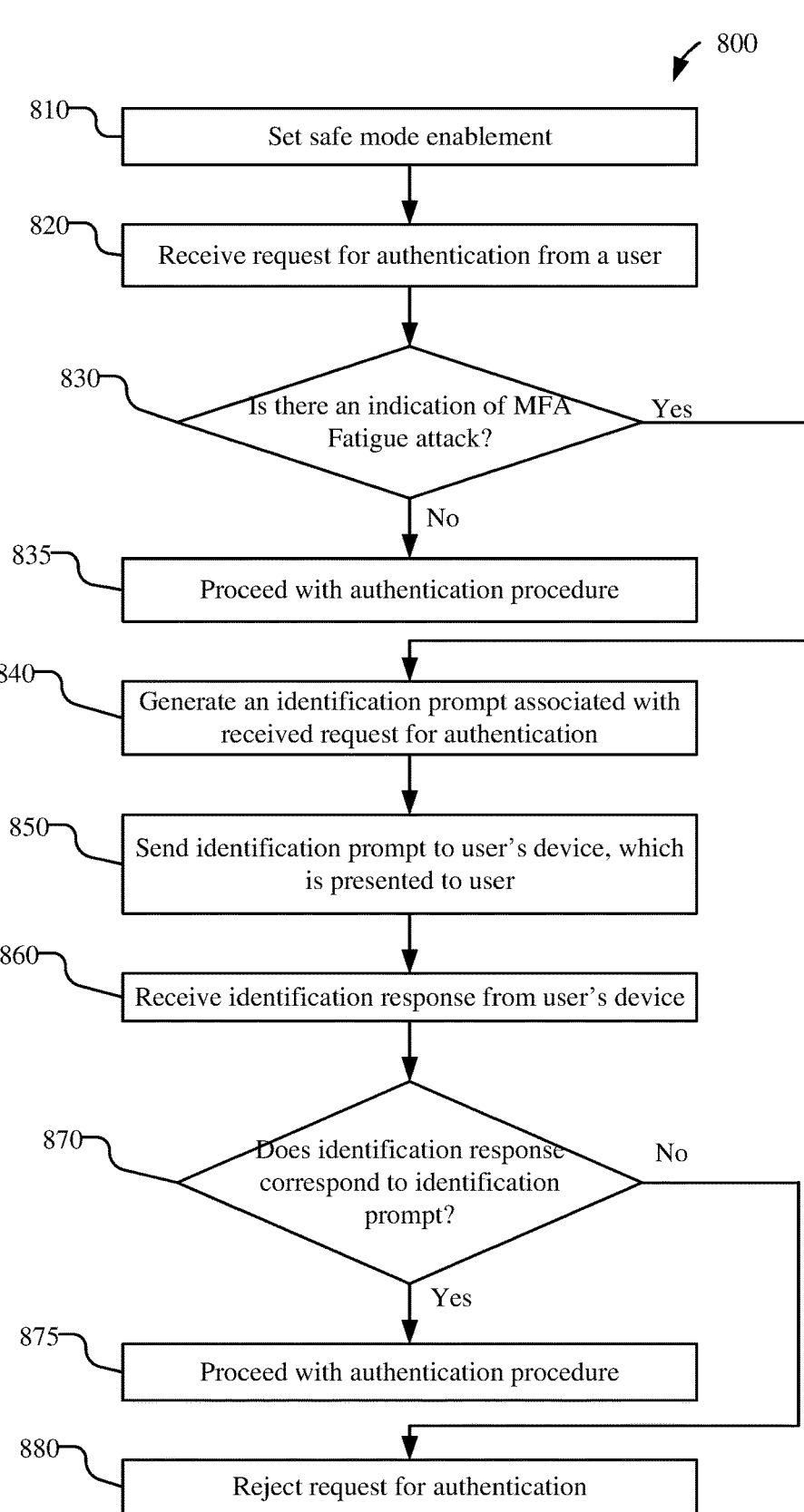
FIG. 8 is a flow chart illustrating an implementation of a method of mitigation of MFA Fatigue attacks.
Figure 9:
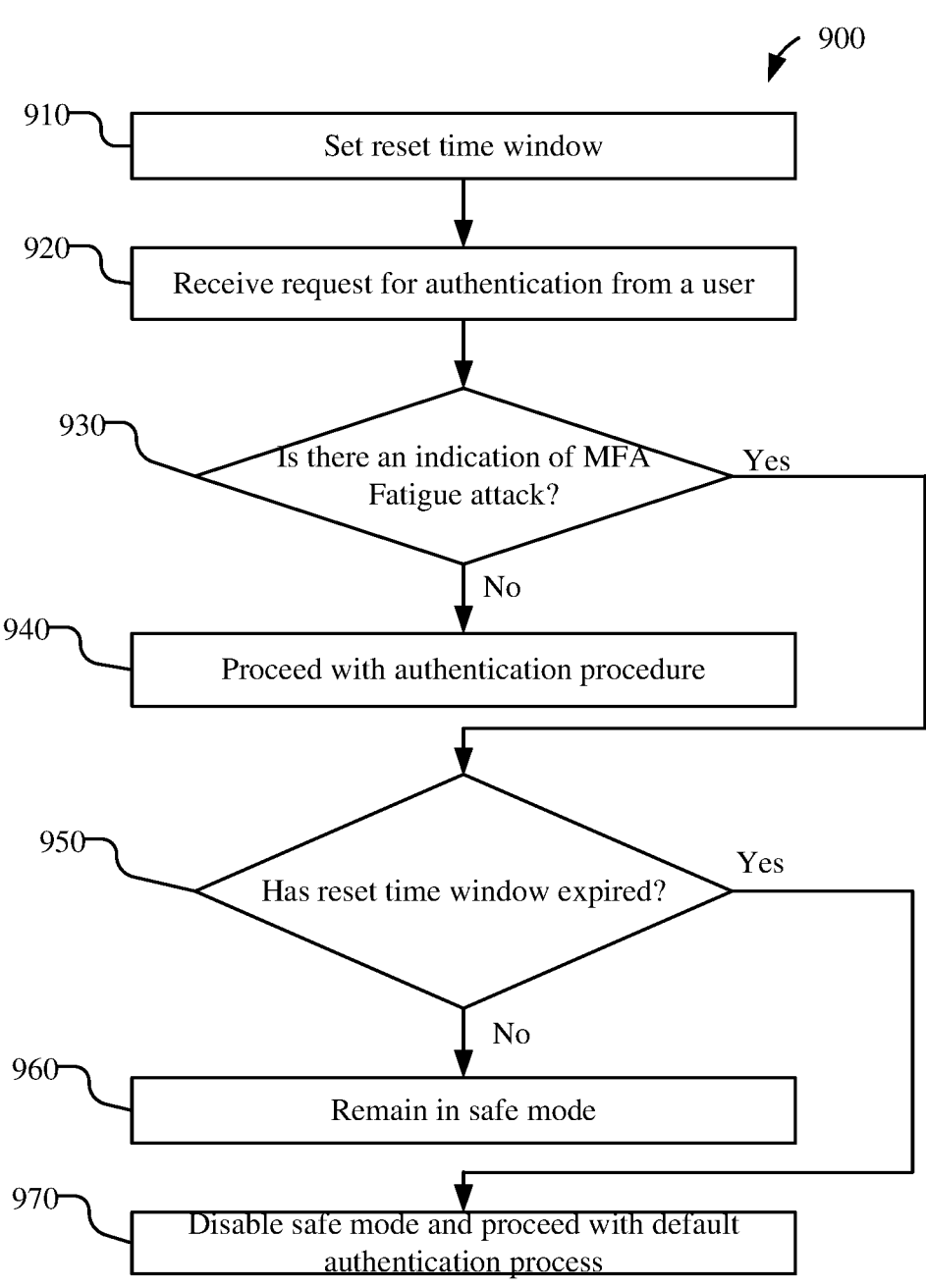
FIG. 9 is a flow chart illustrating an implementation of a method of resolving an MFA Fatigue attack based on system automation.
Figure 10:
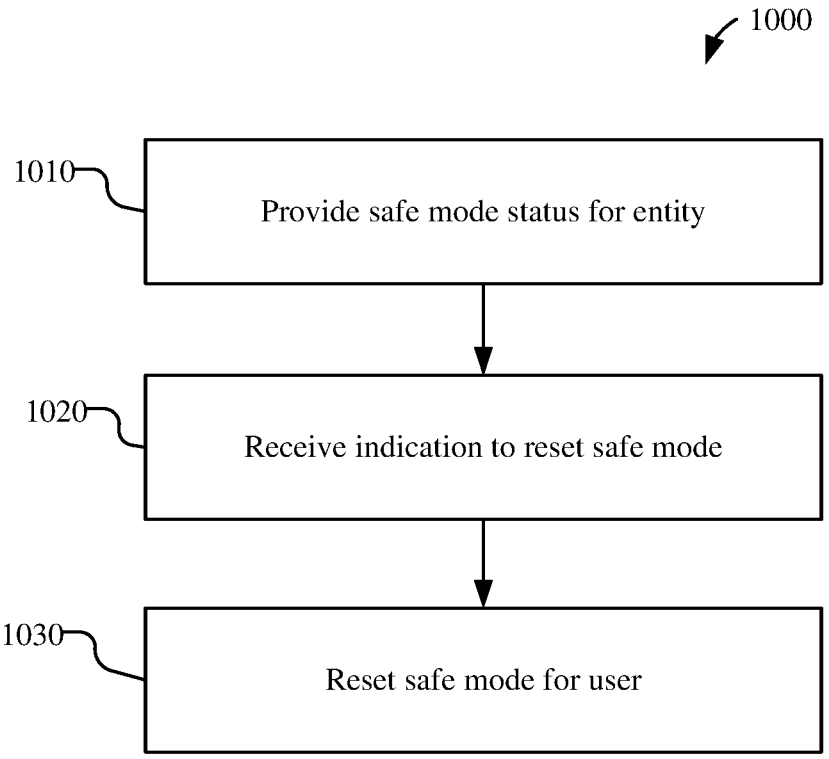
FIG. 10 is a flow chart illustrating an implementation of a method of resolving an MFA Fatigue attack based on administrator intervention.

The one or more processors 230 may be configured to operate as an MFA Fatigue Attack Mitigate processor 260 to perform functions, such as those discussed in FIGS. 8-10. For example, the one or more processors 230 may be configured to place the authentication process for an entity, e.g., a user, or group of users, or the entire organization, in a safe mode once an MFA Fatigue attack for the entity has been indicated. The one or more processors 230, for example, may be configured to perform a cancel 262 operation to cancel, i.e., automatically reject, all pending attempts at authentication, e.g., all requests for authentication, for any user in the entity. The one or more processors 230 may be further configured to perform the cancel 262 operation to cancel, i.e., automatically reject, all subsequent requests for authentication for any user in the entity until the MFA Fatigue attack is resolved. In some implementations, the one or more processors 230, for example, may be configured to perform a modify 264 operation to modify the default or nominal authentication procedure for subsequent requests for authentication for any user in the entity so that legitimate users may be identified and allowed to be authenticated. For example, the one or more processors 230 may be configured to modify the authentication procedure to require verification that the initiating device is in the possession of the legitimate user. The one or more processors 230 may be configured to resolve the MFA Fatigue attack, e.g., by taking the authentication out of safe mode after a predetermined amount of time or after administrator intervention, e.g., via the interface 210.

The one or more processors 230 may be configured to operate as an MFA Fatigue Attack train processor 270 to perform functions, such as those discussed in FIG. 11. For example, the one or more processors 230 may be configured to identify users who are vulnerable to MFA Fatigue attacks using simulated authentication attempts to which the users respond. The one or more processors 230 may be configured to identify users who respond incorrectly, and to provide training information to these users. The one or more processors 230 may be further configured to generate and provide, e.g., via interface 210, reports on the simulated authentication attempts and the performance of the users. The simulated authentication attempts may be repeated, particularly for those who fail to respond correctly, to further identify and train susceptible users. In some implementations, the one or more processors 230 may be configured to transition users that are identified as being vulnerable to MFA Fatigue attacks from the default authentication procedure to an authentication procedure that is not prone to MFA Fatigue attacks.

Figure 3:
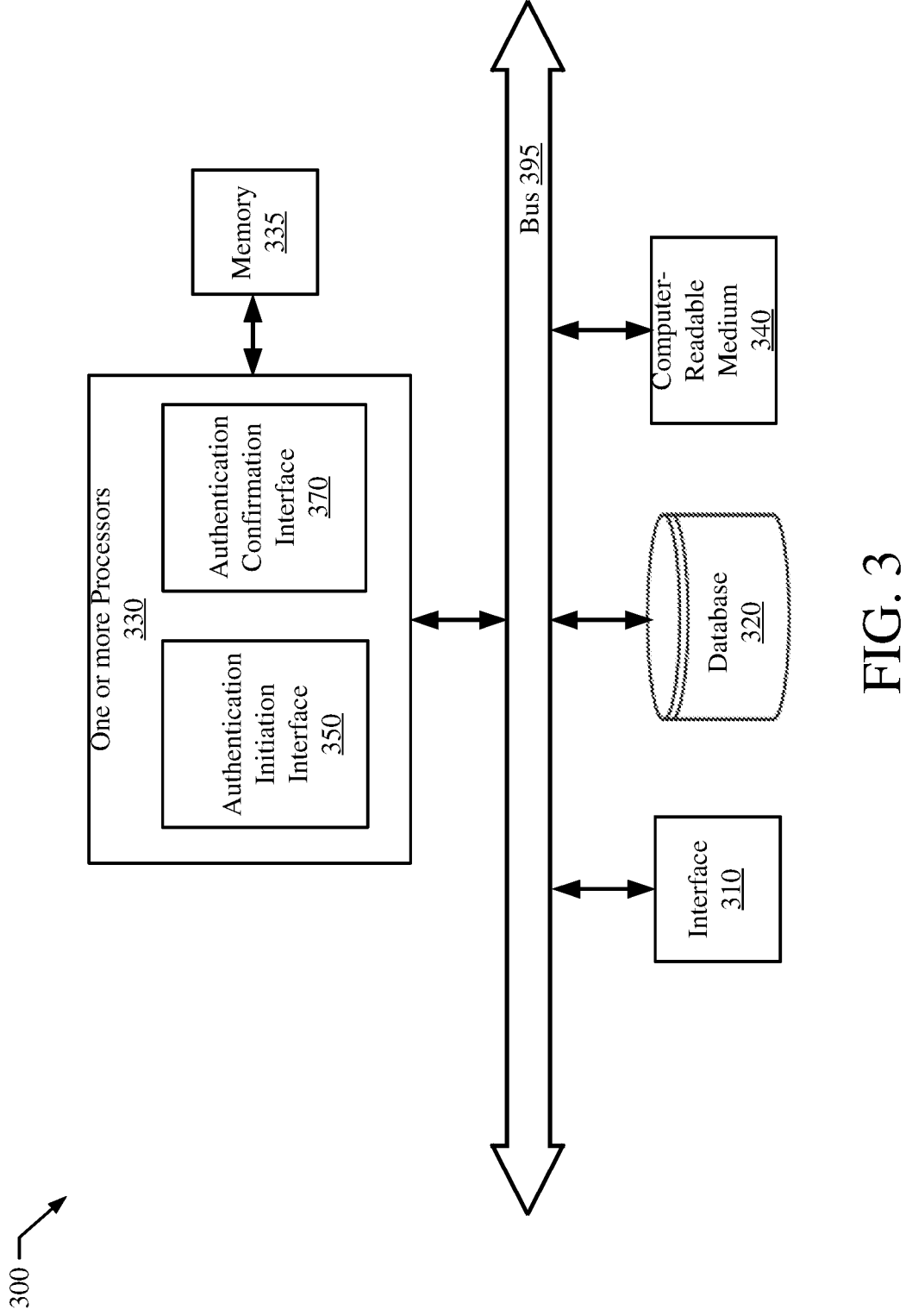
FIG. 3 shows an example computer system that may operate as one or both of the initiating device and confirming device for an authentication system.

FIG. 3 shows an example computer system 300 that may operate as one or both of the initiating device 103 and confirming device 107 for the authentication system 100 shown in FIG. 1, and may be configured for detecting, mitigating and resolving an MFA attack and may be configured for identifying and training users that are vulnerable to MFA attacks, according to implementations discussed herein. The computer system 300 is shown to include an interface 310, a database 320, one or more processors 330, a memory 335 coupled to the one or more processors 330, and computer-readable medium 340. In some implementations, the various components of the computer system 300 may be interconnected by at least a data bus 395, which may be any known internal or external bus technology, including but not limited to ISA (Industry Standard Architecture), EISA (Extended Industry Standard Architecture), PCI (Peripheral Component Interconnect), PCI Express, NuBus, USB (Universal Serial Bus), Serial ATA (Serial Advanced Technology Attachment), or FireWire. In other implementations, the various components of the computer system 300 may be interconnected using other suitable signal routing resources, for example, the components may be distributed among multiple physical locations and coupled by a network connection.

The computer system 300 may be configured to interface with the user 102 and the server 106, shown in FIG. 1, to initiate an attempt at authentication for the user 102, e.g., by sending a request for authentication to an authentication server via interface 310, and to confirm the authentication attempt, e.g., during automatic detection of an MFA Fatigue attack, e.g., either through a system-initiated detection process, user-initiated detection process, or administrator-initiated detection process as discussed herein, e.g., in FIGS. 4-7. The computer system 300 may be configured to interface with the user 102 and the server 106, shown in FIG. 1, during mitigation of a detected MFA Fatigue attack as discussed herein, e.g., in FIGS. 8-10. The computer system 300 may be configured to interface with the user 102 and the server 106, shown in FIG. 1, during identification and training of users who are susceptible to MFA Fatigue attacks as discussed herein, e.g., in FIG. 11.

The computer system 300 may communicate, via the interface 310, with an associated user and with the server 106 through the Authentication Initiation Interface 350, when the computer system 300 operates as an initiating device 103, and through the Authentication Confirmation Interface 360 when the computer system 300 operates as a confirming device. The interface 310 may be one or more input/output (110) interfaces to communicate with the associated, e.g., via the interface 310 which may include a display, a speaker, a mouse, a keyboard, or other suitable input or output elements that allow interfacing with the user.

The interface 310 may include a wired interface or wireless interface to the internet or other means to communicably couple with other devices including the server 106. For example, the interface 310 may include an interface with an ethernet cable or a wireless interface to a modem, which is used to communicate with an internet service provider (ISP) directing traffic to and from other devices.

The database 320 may store data, such as data generated in the authentication processes, including training data, as discussed herein.

The one or more processors 330 may include one or more suitable processors capable of executing scripts or instructions of one or more software programs stored in computer system 300 (such as within the computer-readable medium 340 and/or memory 335). For example, the one or more processors 330 may be capable of executing one or more of the applications. The one or more processors 330 may include a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof that may be configured via hardware, software, or firmware to operate as special purpose processors to perform the functions described herein. For example, the one or more processors 330 may configured to operate as any of an Authentication Initiation Interface 350 or an Authentication Confirmation Interface 360 to perform functions related to detection of an MFA Fatigue attack as discussed in FIGS. 4-7, mitigation of an MFA Fatigue attack as discussed in FIGS. 8-10, and training for an MFA Fatigue attack as discussed in FIG. 11. In one or more implementations, the one or more processors 330 may include a combination of computing devices (such as a combination of a DSP and a microprocessor, a plurality of microprocessors, one or more microprocessors in conjunction with a DSP core, or any other such configuration). In some implementations, particular processes and methods may be performed by circuitry that is specific to a given function.

The memory 335 may be any memory (such as RAM, flash, etc.) that temporarily or permanently stores data, such as any number of software programs, executable instructions, machine code, algorithms, and the like that can be executed by the one or more processors 330 to perform one or more corresponding operations or functions. In some implementations, the memory 335 may be connected directly to or integrated with the one or more processors 330, e.g., as a processing in memory (PIM) chip.

Computer-readable medium 340 may be any computer-readable medium that participates in providing instructions to the one or more processors 330, directly or via memory 335, for execution, including without limitation, non-volatile storage media (e.g., optical disks, magnetic disks, flash drives, etc.), or volatile media (e.g., SDRAM, ROM, etc.). In some implementations, hardwire circuitry may be used in place of, or in combination with, software instructions to implement aspects of the disclosure. As such, implementations of the subject matter disclosed herein are not limited to any specific combination of hardware circuitry and/or software.

Computer-readable medium 340 may include various instructions, such as instructions for implementing an operating system (e.g., Mac OS®, Windows®, Linux, etc.). The operating system may be multi-user, multiprocessing, multitasking, multithreading, real-time, and the like. The operating system may perform basic tasks, including but not limited to recognizing input data from the interface 310, sending output data to the user and/or server via the interface 310, keeping track of files and directories on computer-readable medium 340, controlling peripheral devices (e.g., disk drives, printers, etc.) which can be controlled directly or through an I/O controller, and managing traffic on bus 395. Computer-readable medium 340 may further include network communications instructions to establish and maintain network connections via the interface 310 (e.g., software for implementing communication protocols, such as TCP/IP, HTTP, Ethernet, telephony, etc.).

As illustrated, the one or more processors 330 is configured to perform various functions, as discussed herein. For example, the one or more processors 330 may be configured to operate as an Authentication Initiation Interface 350, which may interface with the user and server as discussed herein, e.g., during detection of an MFA Fatigue attack as discussed in FIGS. 4-7, or mitigation of an MFA Fatigue attack as discussed in FIGS. 8-10, or training for an MFA Fatigue attack as discussed in FIG. 11.

The one or more processors 330 may be configured to operate as an Authentication Confirmation Interface 360, which may interface with the user and server as discussed herein, e.g., during detection of an MFA Fatigue attack as discussed in FIGS. 4-7, or mitigation of an MFA Fatigue attack as discussed in FIGS. 8-10, or training for an MFA Fatigue attack as discussed in FIG. 11.

The described features may be implemented in one or more computer programs in computer system 200 shown in FIG. 2 or computer system 300 shown in FIG. 3 and that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. A computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices;
magnetic disks such as internal hard disks and removable disks; magneto-optical disks; and CD-ROM and DVD-ROM disks. The processor and the memory may be supplemented by, or incorporated in, ASICs (application-specific integrated circuits).

The features may be implemented in a computer system, such as computer system 200 shown in FIG. 2 or computer system 300 shown in FIG. 3, that includes a back-end component, such as a data server, or that includes a middle-ware component, such as an application server or an Internet server, or that includes a front-end component, such as a client computer having a graphical user interface or an Internet browser, or any combination thereof. The compo-nents of the system may be connected by any form or medium of digital data communication such as a commu-nication network. Examples of communication networks include, e.g., a telephone network, a LAN, a WAN, and the computers and networks forming the Internet. The computer system may include clients and servers. A client and server may generally be remote from each other and may typically interact through a network. The relationship of client and server may arise by virtue of computer programs running on the respective computers and having a client-server relation-ship with each other.

One or more features or steps described herein may be implemented using an Application Programming Interface (API) and/or Software Development Kit (SDK), in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documenta-tion, libraries, code samples, and other utilities.

The API and/or SDK may be implemented as one or more calls in program code that send or receive one or more parameters through a parameter list or other structure based on a call convention defined in an API and/or SDK speci-fication document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a pro-grammer will employ to access functions supporting the API and/or SDK.

In some implementations, an API and/or SDK call may report to an application the capabilities of a device running the application, such as input capability, output capability, processing capability, power capability, communications capability, etc.

The detection of MFA Fatigue attacks using an authenti-cation system, may be based on a system-initiated detection process, or a user-initiated detection process, or an admin-istrator-initiated detection process.

Figure 4:
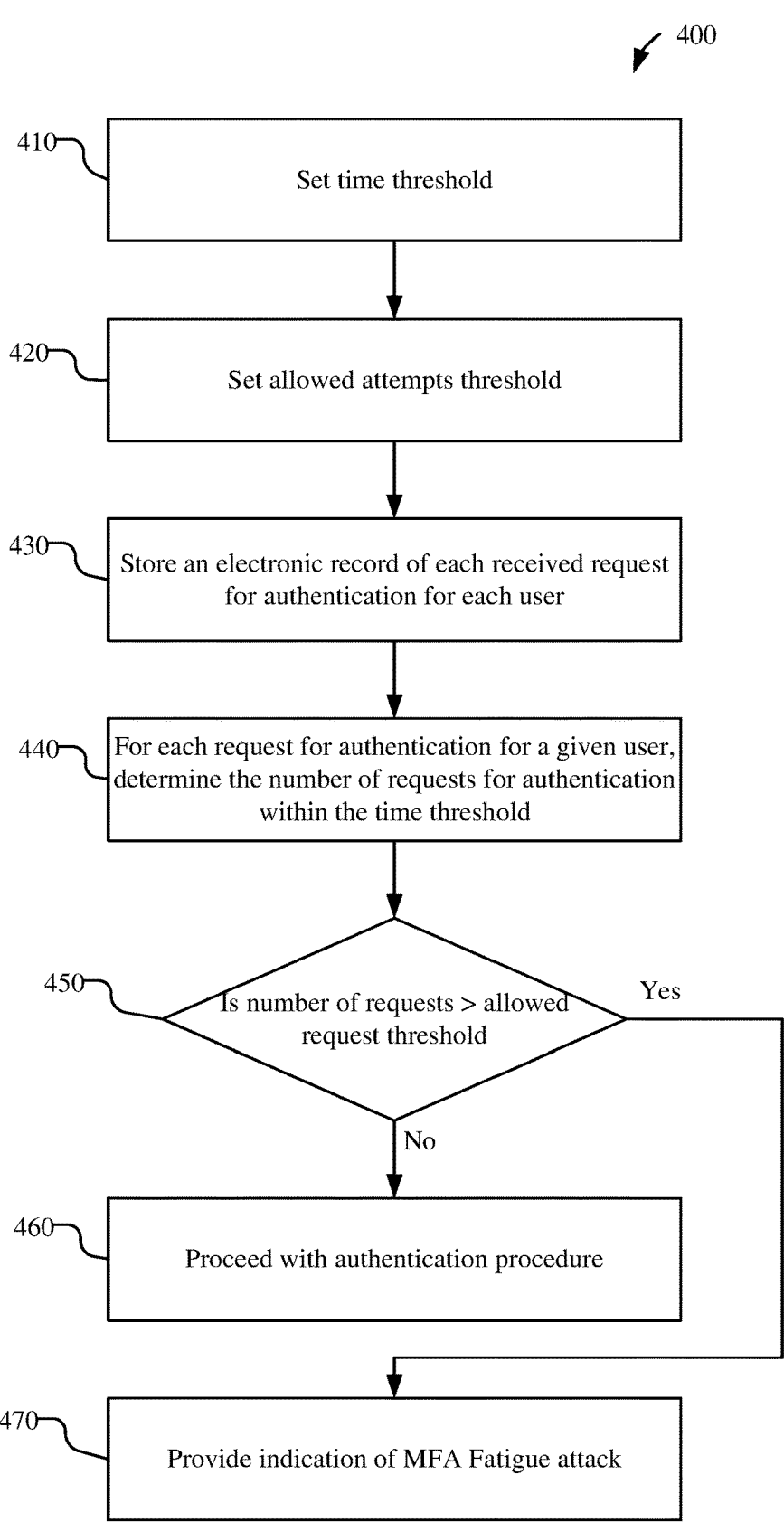
FIG. 4 is a flow chart illustrating an implementation of a method of automated detection of MFA Fatigue attacks based on a system-initiated detection process.

FIG. 4 is a flow chart 400 illustrating an implementation of a method of automated detection of MFA Fatigue attacks based on a system-initiated detection process. The process illustrated in flow chart 400 may be implemented on a computer system, such as on server 106, shown in FIG. 1, or computer system 200, shown in FIG. 2, that receives and handles electronically transmitted authentication requests from one or more users, e.g., via the devices associated with each respective user, such as devices 103 and 107 shown in FIG. 1 or computer system 300, shown in FIG. 3. It should be understood that the process illustrated in flow chart 400 is automated on a computer system and is scalable to any number of users.

As illustrated at 410, a time threshold, sometimes referred to as a the lookback threshold (LT), is set. The lookback threshold is the time period used by the computer system to evaluate whether an MFA Fatigue attack is occurring. The computer system, for example, will look back in time from the current instant of receiving a request for authentication for a user over the lookback threshold time window to determine the total number of requests for authentication for a given user. The lookback threshold may be set, e.g., by an administrator or user, e.g., via computer interface (portal, web, mobile, etc.). In some implementations, the lookback threshold may be set by system default, e.g., the lookback threshold may be fixed or the system may use a default value if the administrator or user does not set the value. The lookback threshold may be set to a different value for each individual user, for groups of users, or for an entire organi-zation, i.e., all users within the organization.

At 420, an allowed attempts threshold, sometimes referred to as the allowed lookback attempts (ALA), is set. The allowed lookback attempts is the threshold number of allowed requests for authentication for a given user within the lookback threshold used by the computer system to evaluate whether an MFA Fatigue attack is occurring. The computer system, for example, will evaluate whether the total number of requests for authentication for a given user within the lookback threshold time window exceeds the allowed lookback attempts to determine whether an MFA Fatigue attack is occurring. The allowed lookback attempts may be set, e.g., by an administrator or user, e.g., via computer interface (portal, web, mobile, etc.). In some implementations, the allowed lookback attempts may be set by system default, e.g., the allowed lookback attempts may be fixed or the system may use a default value if the administrator or user does not set the value. The allowed lookback attempts may be set to a different value for each individual user, for groups of users, or for an entire organi-zation, i.e., all users within the organization.

At 430, for each incoming request for authentication for a given user received by the computer system, the computer system stores an electronic record, e.g., in memory 225 or in a database 220, which may sometimes be referred to as an authentication attempt record (AAR). The received request for authentication for a given user, for example, may include an identifier for the user. The authentication attempt record, for example, may include the identifier for the user and the time of the request for authentication. In some implemen-tations, the authentication attempt record may further include an identifier of the originating system, e.g., device, from which the request for authentication for the user was received. The computer system, for example, may evaluate whether the total number of originating systems used for originating requests for authentication for a given user within the lookback threshold time window exceeds the threshold number of allowable originating systems to deter-mine whether an MFA Fatigue attack is occurring. In some implementations, the number of originating systems may be used to dynamically vary the lookback threshold or the allowed lookback attempts. For example, the threshold number of allowed requests for authentication may decrease as the number of originating systems increases, or the lookback threshold may increase as the number of originat-ing systems increases. In some implementations, for example, a threshold number of allowable originating sys-tems may be set, e.g., by an administrator or user, e.g., via computer interface (portal, web, mobile, etc.). In some implementations, the allowable originating systems may be set by system default, e.g., the allowable originating systems may be fixed or the system may use a default value if the administrator or user does not set the value. The allowable originating systems may be set to a different value for each individual user, for groups of users, or for an entire organization, i.e., all users within the organization.

At 440, for each incoming request for authentication for a given user received by the computer system, the computer system determines the number of requests for authentication within the time window prior to the current request for authentication determined based on the lookback threshold. The computer system, for example, accesses the authentication attempt record for the given user and determines the number of requests for authentication, sometimes referred to herein as lookback attempts (LA) based on the times stored in the authentication attempt record. The number of lookback attempts is distinct for every user and is determined for a given user at each received request for authentication on their account. The previous requests for authentication included in the lookback attempts may include one or more of successful, unsuccessful, and indeterminate authentications. Successful authentications, for example, are where the user has confirmed the authentication attempt, unsuccessful authentications are where the user has rejected them or marked them unsure, and indeterminate authentications are where the user has not responded yet. The exact authentication attempt types that is used to determine the lookback attempts may be configurable within the computer system, e.g., by an administrator or user, or may be a default value. Additionally, in some implementations, the computer system may determine the lookback attempts based on requests for authentication from the same originating system. In other implementations, the computer system may determine the number of different originating systems in the lookback attempts, which may be used to adjust the lookback threshold or the allowed lookback attempts.

At 450, for each request for authentication for a given user, the computer system compares the lookback attempts to the allowed lookback attempts.

At 460, if the lookback attempts is determined to not exceed the allowed lookback attempts in 450, the computer system may determine that an MFA Fatigue attack is not occurring and may proceed with a default authentication procedure.

At 470, if the lookback attempts is determined to exceed the allowed lookback attempts in 450, the computer system determines that an MFA Fatigue attack is occurring and provides an indication of the MFA Fatigue attack. By way of example, computer system may electronically set a flag, sometimes referred to herein as the attack flag (AF). The attach flag may be set for an entity that may be the individual user, a group of users that includes the user, or for the entire organization. As an example, the attack flag may be set for a group that includes the user or the entire organization based on a policy to protect the larger entity when an MFA Fatigue attack is detected for a single user. The entity on which the attack flag is set may be configurable by the administrator or user, e.g., via computer interface (portal, web, mobile, etc.). In some implementations, the entity on which the attack flag is set may be configured by system default, e.g., it may be fixed or the system may use a default if the administrator or user does not alter it. Additionally, the entity on which the attack flag is set may be configured to be different for different users or groups of users. The computer system may record the time that the attack flag is set, which may be used for later resolution of the MFA Fatigue attack.

It should be noted that the indication of the MFA Fatigue attack need not be a single attack flag. For example, the computer system may use a score, which may be adjusted based on the above-identified process, and may be compared to a preset threshold value to determine if an MFA Fatigue attack is occurring. In some implementations, the determination of the score may incorporate factors other than whether the lookback attempts is determined to exceed the allowed lookback attempts in 450, such as the number of originating systems, the location of originating systems, the user behavior on the computer systems, the time of the origination of the attempt at authorization, the identity of the particular originating system, etc., all of which may be stored as part of the authentication attempt record at 430. Unless otherwise indicated, it should be understood that reference to an attack flag may include the scoring process. For example, reference to whether the attack flag is set or not may be read to indicate that the score in such a process exceeds or is less than the preset threshold value. Additionally, reference to setting of the attack flag may be interpreted as increasing the score above the predetermined threshold value. Reference to clearing the attack flag may be interpreted as decreasing the score below the predetermined threshold value. The preset threshold value, for example, may be configurable by administrator or user, e.g., via computer interface (portal, web, mobile, etc.). In some implementations, the preset threshold value may be configured by system default, e.g., it may be fixed or the system may use a default if the administrator or user does not alter it. Additionally, the preset threshold value may be configured to be different for different users or groups of users.

Figure 5:
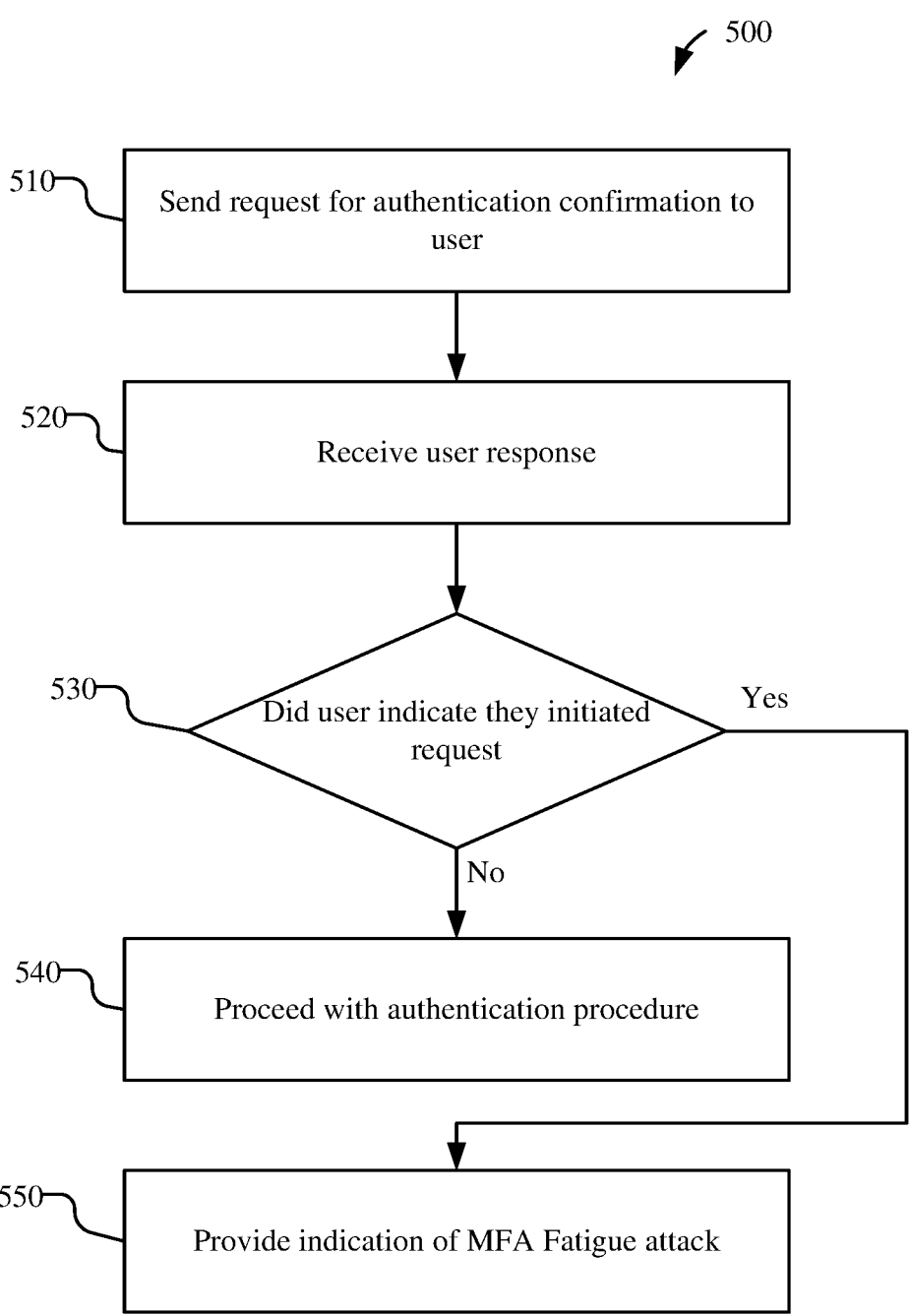
FIG. 5 is a flow chart illustrating an implementation of a method of detection of MFA Fatigue attacks based on a user-initiated detection process.

FIG. 5 is a flow chart 500 illustrating an implementation of a method of detection of MFA Fatigue attacks based on a user-initiated detection process. The process illustrated in flow chart 500 may be implemented on a computer system, such as on server 106, shown in FIG. 1, or computer system 200, shown in FIG. 2, that receives and handles electronically transmitted authentication requests from one or more users, e.g., via the devices associated with each respective user, such as devices 103 and 107 shown in FIG. 1 or computer system 300, shown in FIG. 3. It should be understood that the process illustrated in flow chart 500 is automated on a computer system and is scalable to any number of users. The process illustrated in flow chart 500, for example, may be performed during a default authentication procedure and in some implementations may occur after a determination that the lookback attempts do not exceed the allowed lookback attempts in 450 and 460 of FIG. 4.

As illustrated at 510, for an incoming request for authentication for a given user received by the computer system, the computer system sends a request for authentication confirmation to the device associated with the user to verify that they initiated the authentication request. The request for authentication confirmation may be presented to the user via the user interface, such as the display on the user's device. The request for authentication confirmation may have an option for the user to indicate that they initiated the request for authentication, or to indicate that they did not initiate the request for authentication, and in some implementations, to indicate that they are not sure whether they initiated the request for authentication. FIG. 6, by way of example, illustrates a request for authentication confirmation 600 that may be presented to the user via the display of a confirming device. The user may select "Unsure" to indicate that they are not sure they initiated the authentication attempt or may definitively reject the authentication confirmation request by selecting "Not Me."

At 520, the computer system receives the user response to the request for authentication confirmation from the device associated with the user.

At 530, the computer system determines whether the response to the request for authentication confirmation from the user indicates that the user initiated the attempt at authentication.

At 540, if the user indicated that they initiated the request for authentication at 530, the computer system may determine that an MFA Fatigue attack is not occurring and may proceed with a default authentication procedure.

At 550, if the user does not indicate that they initiated the request for authentication at 530, the computer system determines that an MFA Fatigue attack is occurring and provides an indication of the MFA Fatigue attack. By way of example, computer system may electronically set the attack flag or may increase the score to be greater than the predefined threshold value, as discussed above. The computer system may record the time that the attack flag is set, which may be used for later resolution of the MFA Fatigue attack.

Figure 7:
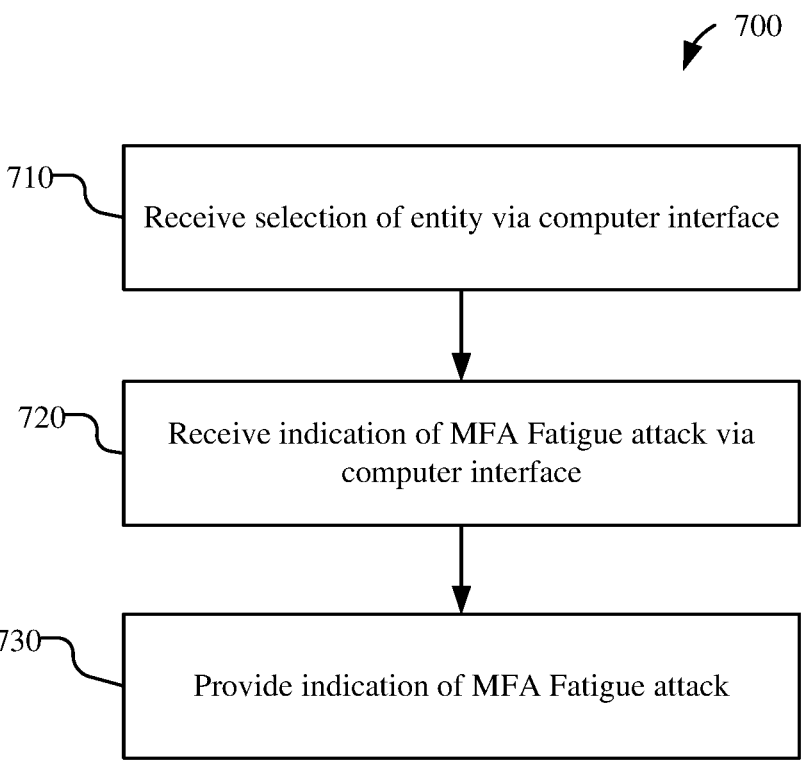
FIG. 7 is a flow chart illustrating an implementation of a method of detection of MFA Fatigue attacks based on an administrator-initiated detection process.

FIG. 7 is a flow chart 700 illustrating an implementation of a method of detection of MFA Fatigue attacks based on an administrator-initiated detection process. The process illustrated in flow chart 700 may be implemented on a computer system, such as on server 106, shown in FIG. 1, or computer system 200, shown in FIG. 2, that receives and handles electronically transmitted authentication requests from one or more users, e.g., via the devices associated with each respective user, such as devices 103 and 107 shown in FIG. 1 or computer system 300, shown in FIG. 3. It should be understood that the process illustrated in flow chart 700 is automated on a computer system and is scalable to any number of users. The process illustrated in flow chart 700, for example, may be performed during a default authentication procedure and in some implementations may occur after a determination that the lookback attempts does not exceed the allowed lookback attempts in 450 and 460 of FIG. 4.

As illustrated at 710, the computer system may receive a selection of an entity that is undergoing an MFA Fatigue attack from an administrator of the computer system via a computer interface (portal, web, mobile, etc.). In some implementations, a user may select the entity via the computer interface. The entity may be, e.g., an individual user, a group of users, or the entire organization. The selection of entities may be limited to only entities over which the administrator (or user) has authorization.

At 720, the computer system receives an indication from the administrator (or in some implementations, the user) via the computer interface that the entity is undergoing an MFA Fatigue attack. In some implementations, the selection of the entity in 710 may serve as the indication that the entity is undergoing an MFA Fatigue attack.

At 730, the computer system provides an indication of the MFA Fatigue attack on the entity. By way of example, computer system may electronically set the attack flag or may increase the score to be greater than the predefined threshold value, as discussed above. The computer system may record the time that the attack flag is set, which may be used for later resolution of the MFA Fatigue attack.

Once an MFA Fatigue attack has been identified, e.g., based on a system-initiated detection process as illustrated in FIG. 4, a user-initiated detection process as illustrated in FIG. 5, an administrator-initiated detection process as illustrated in FIG. 7, or in any other detection process, the computer system may mitigate the MFA Fatigue attack. As discussed above, the MFA Fatigue attack may be identified for an entity, such as an individual user, group of users, or an entire organization. The computer system may take one or more measures to mitigate the MFA Fatigue attack on the entity. For example, after an MFA Fatigue attack has been identified for the entity, the computer system may place the authentication process for that entity in a "safe mode" (SM) in order to block improper authentication due to the MFA Fatigue attack. For example, after an MFA Fatigue attack for an entity has been identified, the computer system may cancel, i.e., reject, all pending attempts at authentication for the entity. Pending attempts at authentication may include any request for authentication that have not received a response to a request for authentication confirmation from a user or may include any request for authentication that has not been finalized (e.g., a response to the request for authentication confirmation from the user has been received but computer system has not yet finalized the authentication process). Cancelling pending attempts at authentication to mitigate the MFA Fatigue attack is prudent because an attacker may have launched multiple authentication requests over a short period of time, some of which may still be in process after the MFA Fatigue attack has been identified.

Additionally, after an MFA Fatigue attack for an entity has been identified, the computer system may mitigate the MFA Fatigue attack by automatically rejecting all subsequent requests for authentication for the entity until the MFA Fatigue attack has been resolved, e.g., by waiting a predetermined amount of time or by administrator intervention. Rejecting subsequent requests for authentication after identification of the MFA Fatigue attack is prudent because an attacker may continue to launch authentication requests after the MFA Fatigue attack has been identified.

It may be desirable, however, to allow legitimate users to continue to obtain authorization to access accounts even after an MFA Fatigue attack has been identified. Accordingly, in some implementations of mitigation of an MFA Fatigue attack against an entity after it has been identified, the computer system may modify the authentication procedure for the entity in order to distinguish an authentication attempt that originated by a legitimate user from an authentication attempt that originated by an attacker. In some implementations, the default authentication process, which pushes notifications for confirmation of authentication attempts to a confirming device associated with the user, may be modified to require verification that the initiating device is in the possession of the user.

FIG. 8 is a flow chart 800 illustrating an implementation of a method of mitigation of MFA Fatigue attacks. The process illustrated in flow chart 800 may be implemented on a computer system, such as on server 106, shown in FIG. 1, or computer system 200, shown in FIG. 2, that receives and handles electronically transmitted authentication requests from one or more users, e.g., via the devices associated with each respective user, such as devices 103 and 107 shown in FIG. 1 or computer system 300, shown in FIG. 3. It should be understood that the process illustrated in flow chart 800 is automated on a computer system and is scalable to any number of users.

As illustrated at 810, a safe mode (SM) enablement may be set for the computer system. In safe mode, if there is an indication of an MFA Fatigue attack, a legitimate user needs to be distinguished by the authentication system from an attacker. Accordingly, if there is an indication of an MFA Fatigue attack when safe mode is enabled, the computer system modifies the authentication procedure in order to determine that it is indeed a legitimate user who is initiating an attempt at authentication. The modification of the authentication procedure, for example, may require that the initiating device is in the user's possession, e.g., using an identification prompt and response passed through the confirming device and initiating device and/or additional verification of the user's identification before proceeding with the authentication process. If the safe mode enablement is not set, by way of example, if there is an indication of an MFA Fatigue attack for an entity, any member of the entity may not be permitted to authenticate until the MFA Fatigue attack is resolved. The safe mode enablement may be set, e.g., by an administrator or user, e.g., via computer interface (portal, web, mobile, etc.). In some implementations, the safe mode enablement may be set by system default, e.g., the safe mode enablement may be fixed or the system may use a default if the administrator or user does not alter the safe mode enablement. The safe mode enablement may be set to be different for each individual user, for groups of users, or for an entire organization, i.e., all users within the organization.

At 820, the computer system receives an incoming request for authentication for a user. For example, as discussed in steps 1 and 2 of FIG. 1, the user may initiate an authentication request using an initiating device, e.g., through an Authentication Initiation Interface (AII). The initiation request may be, for example, a login request such as when the user enters an email address into a web browser of the device, enters a physical area, etc., and the initiating device may send the request for authentication to the computer system. Alternatively, the incoming request for authentication for the user may be received via an initiating device from an attacker as part of an MFA Fatigue attack.

At 830, the computer system determines whether there is an indication of an MFA Fatigue attack for an entity that includes the user. For example, the entity may be the user, or may be a group that includes the user, or may be an entire organization that includes the user. By way of example, as discussed above, the indication of an MFA Fatigue attack may be an attack flag that is set for the entity or a score associated with the entity that is greater than a predefined threshold value.

At 835, if there is no indication of MFA Fatigue attack for an entity that includes the user, the computer system may proceed with a default authentication procedure. For example, the computer system may push a confirmation request to a confirming device associated with the user, e.g., confirming device 107 shown in FIG. 1. The user uses an interface on that device, e.g., the Authentication Confirmation Interface (ACI), to confirm that they initiated the authentication. In some cases, the Authentication Initiation Interface and the Authentication Confirmation Interface may reside on different physical devices, although in most cases they will be on different devices.

At 840, if there is an indication of MFA Fatigue attack for an entity that includes the user, the computer system will modify the authentication procedure, e.g., by requiring verification that the initiating device is in the user's possession before proceeding with the authentication process. For example, the computer system may generate an identification prompt that is associated with the attempt at authentication for the user. As an example, the computer system may generate a safe mode secret (SMS) that is associated with the request for authentication. The safe mode secret may be a password or a set of digits. In some implementations, the identification prompt may be a visual code that encodes information into a visual bar or matrix code that can be easily read and processed by mobile devices, such as a QR (quick response) code or bar code. The encoded information, for example, may be information unique to the user, such as the user's identifier within the computer system database, a sequence identifier that uniquely identifies the current request for authentication, a date and time, a unique Uniform Resource Locator (URL), etc. In some implementations, the computer system generates the visual code based on the information and, at 850 below, sends the visual code to the device associated with the user. In some implementations, the computer system generates the identification prompt as only the information that is to be encoded in the visual code and, at 850 below, sends only the information to the device associated with the user and the device is configured to encode the information in the visual code. The computer system stores the identification prompt or information from the identification prompt with a link to the request for authentication for the user. In some implementations, the identification prompt may be preset for the user or a group of users, e.g., by an administrator.

At 850, the computer system sends the identification prompt to a first device, such as the confirming device associated with the user or to the initiating device. For example, the identification prompt may be sent to the Authentication Confirmation Interface (ACI) in confirming device 107 shown in FIG. 1, or the identification prompt may be sent to the Authentication Initiation Interface (AII) in initiating device 103 shown in FIG. 1. The first device associated with the user may be configured to verify the user's identity, e.g., using one or more of biometrics, a password or PIN, and upon verification of the user's identity, the first device presents the identification prompt to the user, e.g., via the display. As discussed above, if the identification prompt is a safe mode secret or a visual code, the first device may display the safe mode secret or the visual code to the user, e.g., via a display on the first device. Additionally, as discussed above, in some implementations, the first device may process or alter the format of the identification prompt received from the server prior to presentation to the user. For example, if the identification prompt is information to be encoded in a visual code, the first device, e.g., the Authentication Initiation Interface (AII) or the Authentication Confirmation Interface (ACI) in the first device, may be configured to generate the visual code based on the information prior to displaying the visual code to the user, e.g., via a display on the first device.

A second device may prompt the user to enter the information from the identification prompt as an identification response. The second device, for example, may be the same device that originated the request for authentication for the user. For example, the Authentication Initiation Interface (AII) in initiating device 103 shown in FIG. 1 may prompt the user to enter the identification response. In some implementations, the second device may require verification of the user's identity, e.g., using one or more of biometrics, a password or PIN, before permitting entry of the identification response. In some implementations, only one of the first device and the second device may require verification of the user's identity before proceeding with the authentication procedure. In another implementation, both the first device and the second device may require verification of the user's identity before proceeding with the authentication procedure.

In another example, the identification prompt may be sent to the same device that originated the request for authentication for the user. For example, the identification prompt may be sent to the Authentication Initiation Interface (AII) in initiating device 103 shown in FIG. 1. In this example, the second device that prompts the user to enter the information from the identification prompt as an identification response may be the confirming device. For example, the Authentication Confirmation Interface (ACI) in device 107 shown in FIG. 1 may prompt the user to enter the identification response. In some implementations, one or both of the first device and the second device may require verification of the user's identity before proceeding with the authentication procedure.

In one example, the identification prompt may be the safe mode secret, which is displayed to the user on a first device, and the user enters the safe mode secret as the identification response into the second device, e.g., which may sometimes be referred to herein as the entered safe mode secret (ESMS). In another example, the identification prompt may be the visual code, which may be displayed on the first device. The user may be instructed, e.g., by the first device or the second device, to collect an image of the visual code displayed on the first device, e.g., using a camera on the second device. In one example, the visual code may be displayed to the user on the first device, and the user collects the image of the visual code on the second device. The identification response may be the image of the visual code or decoded information from the visual code. In some implementations, one or more intervening devices may be present between the second device and the computer system. For example, if the visual code encodes a URL, the second device may read the visual code and acquire the URL. The second device may access the website referenced by the URL via a browser or programmatically and the website may send the identification response to the computer system.

At 860, the computer system receives the identification response from the user's second device, which may be received indirectly through one or more intervening devices and websites, as discussed above.

At 870, the computer system determines if the identification response corresponds to the identification prompt. For example, if the identification prompt is the safe secret, the computer system determines if the entered safe mode secret (ESMS) from the identification response matches the safe mode secret (SMS). If the identification prompt is the visual code, the computer system determines if the identification response includes information corresponding to the visual code, e.g., the visual code itself, the information encoded in the visual code, etc.

At 875, if the identification response corresponds to the identification prompt, the computer system may determine that the initiating device is in possession of the legitimate user and that the request for authentication for the user is not part of the MFA Fatigue attack. The computer system may, accordingly, accept the request for authentication.

At 880, if the identification response does not correctly correspond to the identification prompt, or if an identification response is not received, the computer system may determine that the request for authentication for the user is part of the MFA Fatigue attack and, accordingly, may reject the request for authentication.

Once an MFA Fatigue attack has been identified, e.g., based on a system-initiated detection process as illustrated in FIG. 4, a user-initiated detection process as illustrated in FIG. 5, an administrator-initiated detection process as illustrated in FIG. 7, or in any other detection process, and the computer system places the authentication process into a "safe mode" (SM) to block improper authentication due to the MFA Fatigue attack, the computer system may later resolve the safe mode so that the default authentication process may be used again. Resolution of the safe mode, for example, may be performed automatically by the computer system, e.g., turning off safe mode after a predetermined amount of time. In another example, resolution of the safe made may be performed in response to administrator intervention, e.g., via a portal.

FIG. 9 is a flow chart 900 illustrating an implementation of a method of resolving an MFA Fatigue attack based on system automation. The process illustrated in flow chart 900 may be implemented on a computer system, such as on server 106, shown in FIG. 1, or computer system 200, shown in FIG. 2, that receives and handles electronically transmitted authentication requests from one or more users, e.g., via the devices associated with each respective user, such as devices 103 and 107 shown in FIG. 1 or computer system 300, shown in FIG. 3. It should be understood that the process illustrated in flow chart 900 is automated on a computer system and is scalable to any number of users.

As illustrated at 910, a reset time window (RTW) may be set for the computer system. The reset time window is used by the computer system to determine how long the authentication process for a user is to remain in safe mode once an MFA Fatigue attack for the entity has been identified, e.g., by setting the attack flag for the entity or a score associated with the entity has been generated that is greater than the predefined threshold value. The reset time window may be set, e.g., by an administrator or user, e.g., via computer interface (portal, web, mobile, etc.). In some implementations, the reset time window may be set by system default, e.g., the reset time window may be fixed or the computer system may use a default value if the administrator or user does not alter the reset time window. The reset time window may be set to be different for each individual user, for groups of users, or for an entire organization, i.e., all users within the organization.

At 920, the computer system receives an incoming request for authentication for a user. For example, as discussed in steps 1 and 2 of FIG. 1, the user may initiate an authentication request using an associated device, e.g., through an Authentication Initiation Interface (AII). The initiation request may be, for example, a login request such as when the user enters an email address into a web browser of the device, enters a physical area, etc., and the user's device may send the request for authentication to the computer system.

At 930, the computer system determines whether there is an indication of an MFA Fatigue attack for an entity that includes the user. For example, the entity may be the user, or may be a group that includes the user, or may be an entire organization that includes the user. By way of example, as discussed above, the indication of an MFA Fatigue attack may be an attack flag that is set for the entity or a score associated with the entity that is greater than a predefined threshold value.

At 940, if there is no indication of MFA Fatigue attack for an entity that includes the user at 930, the computer system may proceed with a default authentication procedure. For example, the computer system may trigger a confirmation request on a second device associated with the user, e.g., second device 107 shown in FIG. 1. The user uses an interface on that device, e.g., the Authentication Confirmation Interface (ACI), to confirm that they initiated the authentication. In some cases, the Authentication Initiation Interface and the Authentication Confirmation Interface may reside on different physical devices, although in most cases they will be on different devices.

At 950, if there is an indication of MFA Fatigue attack for an entity that includes the user at 930, the computer system will check to determine if the authentication process should remain in safe mode for the user, e.g., by determining if the reset time window has expired. The computer system, for example, may obtain the time that the attack flag was set or the time that the score exceeded the preset threshold value, which may be stored in memory, and determine if the elapsed time exceeds the reset time window.

At 960, if the reset time window has not expired as determined at 950, the authentication process will remain in safe mode for the user. For example, the authentication process for the user may proceed using mitigation strategies, such as those discussed above.

At 970, if the reset time window has expired as determined at 950, the safe mode may be disabled for the user or the entire entity, and the computer system may proceed with a default authentication procedure. For example, the safe mode may be disabled by resetting the attack flag or by decreasing the score to below the preset threshold value. For example, the computer system may trigger a confirmation request on a second device associated with the user, e.g., second device 107 shown in FIG. 1. The user uses an interface on that device, e.g., the Authentication Confirmation Interface (ACI), to confirm that they initiated the authentication. In some cases, the Authentication Initiation Interface and the Authentication Confirmation Interface may reside on different physical devices, although in most cases they will be on different devices.

FIG. 10 is a flow chart 1000 illustrating an implementation of a method of resolving an MFA Fatigue attack based on administrator intervention. The process illustrated in flow chart 1000 may be implemented on a computer system, such as on server 106, shown in FIG. 1, or computer system 200, shown in FIG. 2, that receives and handles electronically transmitted authentication requests from one or more users, e.g., via the devices associated with each respective user, such as devices 103 and 107 shown in FIG. 1 or computer system 300, shown in FIG. 3. It should be understood that the process illustrated in flow chart 1000 is automated on a computer system and is scalable to any number of users.

As illustrated at 1010, the computer system may provide the safe mode status for an entity to an administrator, e.g., via a portal. The administrator may review the safe mode status and, if in safe mode, may intervene to resolve the safe mode for the authentication process for the user. In some implementations, the computer system may provide the administrator with a recording of the user that was previously endorsed, e.g., by the user's peers, or a group in the organization at the time that the user enrolled their device with the authentication system. The administrator may compare the endorsed video, e.g., to a live call video for the user to confirm the identity of the user before the administrator intervenes to resolve the safe mode for the authentication process.

At 1020, the computer system receives an indication from the administrator to reset the safe mode for the user, e.g., via the portal.

At 1030, the computer system may reset the safe mode for the user. For example, the safe mode may be disabled by resetting the attack flag or by decreasing the score to below the preset threshold value. Once the reset mode is reset, the user may a default authentication procedure may be used for the user. For example, in response to a request for authentication from the user, the computer system may trigger a confirmation request on a second device associated with the user, e.g., second device 107 shown in FIG. 1. The user uses an interface on that device, e.g., the Authentication Confirmation Interface (ACI), to confirm that they initiated the authentication. In some cases, the Authentication Initiation Interface and the Authentication Confirmation Interface may reside on different physical devices, although in most cases they will be on different devices.

An MFA Fatigue attack may be used to not only attack and comprise a user's individual account, but may be used to gain access to an organization's accounts and, accordingly, may pose a serious compromise to the security of organizations. For example, multiple members of an organization, such as employees of a business, may be targeted with an MFA Fatigue attack, and if a single user incorrectly responds to a notification for confirmation of the authentication attempt, the attacker may access the organization's accounts.

Accordingly, it may be desirable for a computer system to detect users who are more susceptible to MFA Fatigue attacks. Once identified, more susceptible users may be trained to better withstand MFA Fatigue attacks or transitioned to a different type of authentication procedure that are not prone to MFA Fatigue type attacks. By way of example, susceptible users may be identified through the use of simulated authentication attempts (SAA) in which the computer system sends users simulated notifications for confirmation of the authentication attempt to test the users' responses. The simulated authentication attempt did not originate with the users, and accordingly all responses should be a rejection (or an indication that the user is unsure) of the authentication attempt. Any user that accepts the authentication attempt may be identified as being susceptible to MFA Fatigue attacks.

FIG. 11 is a flow chart 1100 illustrating an implementation of a method of identifying users who are susceptible to Multi-Factor Authentication (MFA) Fatigue attacks. The process illustrated in flow chart 1100 may be implemented on a computer system, such as on server 106, shown in FIG. 1, or computer system 200, shown in FIG. 2, that receives and handles electronically transmitted authentication requests from one or more users, e.g., via the devices associated with each respective user, such as devices 103 and 107 shown in FIG. 1 or computer system 300, shown in FIG. 3. It should be understood that the process illustrated in flow chart 1100 is automated on a computer system and is scalable to any number of users.

As illustrated at 1110, simulated authentication attempts for a selected entity are triggered in the computer system. For example, the simulated authentication attempts may be manually triggered by an administrator, e.g., via computer interface (portal, web, mobile, etc.), or may be triggered automatically per a predetermined schedule or at stochastically selected times. The selected entity, for example, may be an individual user, one or more groups of users, or the entire organization. If the selected entity is a user or group of users, the selection may be manually by the administrator or the selection may be random. As an example, the administrator may schedule a subset of users, e.g., sometimes referred to as a SAA group (SAAG), for simulated authentication attempts at a future time or times or by setting a flag for the computer system to run the simulated authentication attempts at random times continually without any special scheduling.

At 1120, once the simulated authentication attempt is triggered, the computer system sends one or more notifications for confirmation of authentication attempts to the respective devices associated with each user in the selected entity. By way of example, each user may be sent one or a plurality of notifications for confirmation of authentication attempts. The notification for confirmation of authentication attempt, for example, may be sent to device 107 shown in FIG. 1 associated with the user, and the Authentication Confirmation Interface (ACI) may prompt the user to confirm whether the user initiated a request for authentication. The correct response for each user is to reject or to report the authentication attempt because the simulated authentication attempt was not initiated by the user. Accordingly, in the request for authentication confirmation 600 shown in FIG. 6, for example, the user should select "Unsure" or Not Me!".

At 1130, the computer system receives the response to the notification for confirmation of authentication attempt from each user and records the response, e.g., by storing each response associated with each respective user in memory or a database.

At 1140, the computer system identifies any user in the entity that did not properly reject the notification for confirmation of authentication attempt from the simulated authentication attempt. The computer system may generate a report for the simulated authentication attempt based on the recorded responses, as well as any previously recorded responses to previous simulated authentication attempts. A report may include a list of the users in the entity, e.g., members of the SAA group, details of each simulated authentication attempt, the user responses, a historical view of each user's performance in prior simulated authentication attempt tests. The report may be stored for future reference or may be provided to the administrator.

At 1150, the computer system may send training information to users that did not properly reject notification for confirmation of authentication attempt. For example, the computer system may send a message, via text, video, and/or audio, to users that did not properly reject the notification for confirmation of authentication attempt. The message, for example, may be sent to the Authentication Confirmation Interface (ACI) of the device associated with the user. The message, for example, may alert the user that they incorrectly confirmed the authentication attempt and may include an explanation of the error, the consequences of making such an error, and how to properly respond on the future. In some implementations, the computer system may additionally send a congratulatory message to the users that properly rejected the notification for confirmation of authentication attempt.

In some implementations, process 1100 may be repeated for the users that did not properly reject the notification for confirmation of authentication attempt. For example, the selected entity at 1110 may be the subset of users who did not properly reject the notification for confirmation of authentication attempt.

In some implementations, the computer system may set a flag or provide a numerical rating for any user that does not properly reject a notification for confirmation of authentication attempt indicating that the user has difficulty distinguishing legitimate notifications for confirmation of authentication attempts from illegitimate ones and is vulnerable to MFA Fatigue attacks. Users who are indicated as being vulnerable to MFA Fatigue attacks may be required to use a modified authentication procedure, such as illustrated in FIG. 8, or if the Authentication Confirmation Interface (ACI) of the device uses video biometric confirmation, then for subsequent authentication confirmations, the user may be prompted to explicitly say on video that they confirm that they initiated the authentication attempt and not someone else.

FIG. 12 is a flow chart illustrating a method 1200 for detecting a Multi-Factor Authentication (MFA) Fatigue attack, which may be performed by a computer system, such as on server 106, shown in FIG. 1, or computer system 200, shown in FIG. 2. The method 1200, for example, may include one or more elements discussed in reference to FIGS. 4-7.

At block 1210, the computer system may receive a request for authentication for a user via an electronic interface, the request for authentication including an identifier of the user, e.g., as discussed at 430 in FIG. 4.

At block 1220, the computer system may store, in an electronic record, the request for authentication for the user including at least the identifier for the user and a time of the request for authentication for the user, e.g., as discussed at 430 in FIG. 4.

At block 1230, the computer system may determine a number of previous requests for authentication for the user received within a predetermined amount of time prior to the request for authentication for the user from the electronic record based on the at least the identifier for the user and times of the previous requests for authentication for the user, e.g., as discussed at 440 in FIG. 4. In some implementations, at least one of the predetermined amount of time and the predetermined threshold number is configurable by the user or an administrator, e.g., as discussed at 410 and 420 in FIG. 4. In some implementations, at least one of the predetermined amount of time and the predetermined threshold number is configurable for individual users, groups of users, or all users within an organization, e.g., as discussed at 410 and 420 in FIG. 4. In some implementations, previous requests for authentication for the user included in the number of previous requests for authentication for the user comprises successful authentications, unsuccessful authentications, and indeterminate authentications, e.g., as discussed at 440 in FIG. 4.

At block 1240, the computer system may indicate that the request for authentication for the user is an MFA Fatigue attack if the number of previous requests for authentication for the user received within the predetermined amount of time is greater than a predetermined threshold number, e.g., as discussed at 450 and 470 in FIG. 4. In some implementations, indicating that the request for authentication for the user is an MFA Fatigue attack may include indicating that the MFA Fatigue attack is against an entity comprising one of only the user, a group of users that includes the user, or an organization that includes the user, e.g., as discussed at 470 in FIG. 4. The entity may be configurable by the user or an administrator, e.g., as discussed at 470 in FIG. 4.

At block 1250, the computer system may proceed with an authentication process for the user if the number of previous requests for authentication for the user received within the predetermined amount of time is not greater than the predetermined threshold number, e.g., as discussed at 450 and 460 in FIG. 4.

In some implementations, an identifier for an originating device for the request for authentication for the user is stored with the request for authentication for the user, and determining the number of previous requests for authentication for the user is further based on the originating device, e.g., as discussed at 430 and 440 in FIG. 4.

In some implementations, after proceeding with the authentication process for the user, the method may further include receiving an indication from the user that the request for authentication for the user is unauthorized, and indicating that the request for authentication for the user is an MFA Fatigue attack, e.g., as discussed in the flow chart 500 illustrated in FIG. 5.

In some implementations, after proceeding with the authentication process for the user, the method may further include receiving an indication from an administrator that an entity comprising one of only the user, a group of users that includes the user, and an organization that includes the user is undergoing an MFA Fatigue attack, and indicating that the request for authentication for the user is an MFA Fatigue attack, e.g., as discussed in the flow chart 700 illustrated in FIG. 7.

Figure 13:
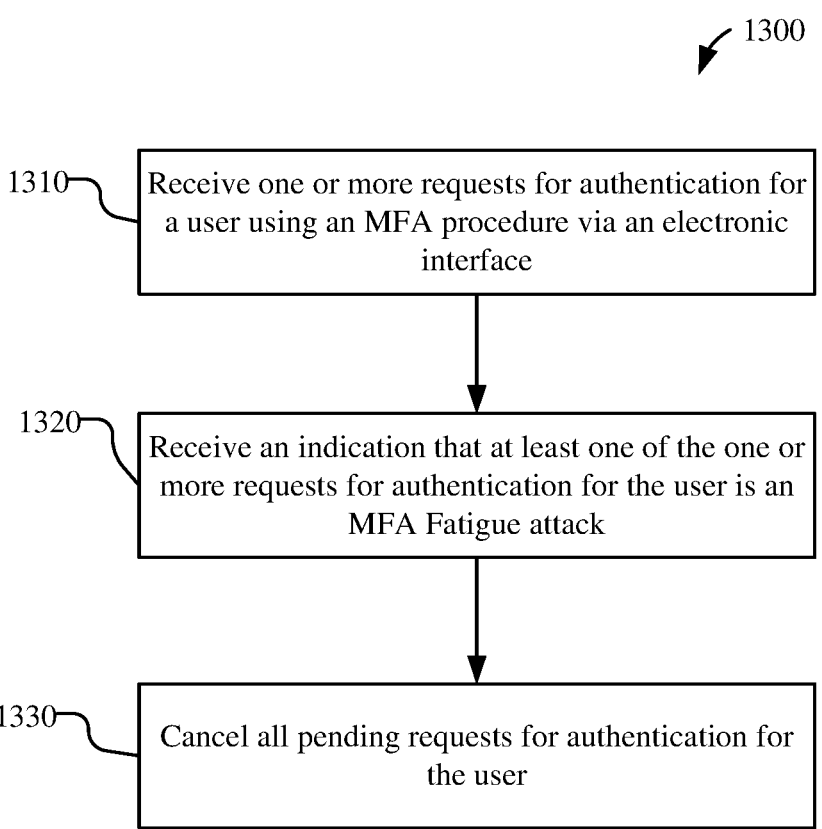
FIG. 13 is a flow chart illustrating a method for mitigating a MFA Fatigue attack, in accordance with an implementation discussed herein.

FIG. 13 is a flow chart illustrating a method 1300 for mitigating a Multi-Factor Authentication (MFA) Fatigue attack, which may be performed by a computer system, such as on server 106, shown in FIG. 1, or computer system 200, shown in FIG. 2. The method 1300, for example, may include one or more elements discussed in reference to FIGS. 8-10.

At block 1310, the computer system may receive one or more requests for authentication for a user using an MFA procedure via an electronic interface, e.g., as discussed in reference to FIG. 8.

At block 1320, the computer system may receive an indication that at least one of the one or more requests for at authentication for the user is an MFA Fatigue attack, e.g., as discussed in reference to FIG. 8.

At block 1330, the computer system may cancel all pending requests for authentication for the user, e.g., as discussed in reference to FIG. 8.

In some implementations, the computer system may cancel all pending requests for authentication for an entity comprising a group of users that includes the user or an organization that includes the user, e.g., as discussed in reference to FIG. 8.

In some implementations, the computer system may further enable a safe mode in which the MFA procedure for any subsequent requests for authentication for the user is modified by requiring a verification of user identity before proceeding with the MFA procedure, e.g., as discussed at 810 of FIG. 8.

By way of example, the computer system may require the verification of user identity by generating an identification prompt associated with a subsequent request for authentication for the user, as discussed at 840 of FIG. 8. The computer system may send the identification prompt to a first device associated with the user, wherein an identification response based on the identification prompt is entered by the user into a second device associated with the user, as discussed at 850 of FIG. 8. The computer system may receive the identification response from the second device associated with the user, e.g., as discussed at 860 of FIG. 8. The computer system may accept the subsequent request for authentication for the user if the identification response corresponds to the identification prompt and rejecting the subsequent request for authentication for the user if the identification response is not received or does not does not correspond to the identification prompt, e.g., as discussed at 870, 875, and 880 of FIG. 8.

By way of example, at least one of the first device is configured to confirm the identity of the user before the identification prompt to the user by the first device or the second device is configured to confirm the identity of the user before the identification response is allowed to be entered by the user into the second device, e.g., as discussed at 850 of FIG. 8. The first device or the second device may confirm the identity of the user based on biometrics, a password, or a Personal Identification Number (PIN), e.g., as discussed at 850 of FIG. 8.

By way of example, the identification prompt may be at least one of a password, set of digits, and a visual code that encodes information associated with the subsequent request for authentication for the user, e.g., as discussed at 840 of FIG. 8. The visual code, for example, may include at least one of an identifier of the user, a sequence identifier that uniquely identifies the subsequent request for authentication for the user, a date and time, and a unique Uniform Resource Locator (URL), e.g., as discussed at 840 of FIG. 8.

In some implementations, the computer system may automatically disable the safe mode after a predetermined amount of time, e.g., as discussed in FIG. 9.

In some implementations, the computer system may disable the safe mode in response to an administrator intervention, e.g., as discussed in FIG. 9.

In some implementations, the computer system may receive the indication that at least one of the one or more request for authentication for the user is the MFA Fatigue attack through receiving an indication from the user that a request for authentication for the user is unauthorized, e.g., as discussed in FIG. 5.

In some implementations, the computer system may receive the indication that at least one of the one or more requests for authentication for the user is the MFA Fatigue attack by receiving an indication from an administrator that an entity comprising one of only the user, a group of users that includes the user, and an organization that includes the user is undergoing an MFA Fatigue attack, e.g., as discussed in FIG. 5.

Figure 14:
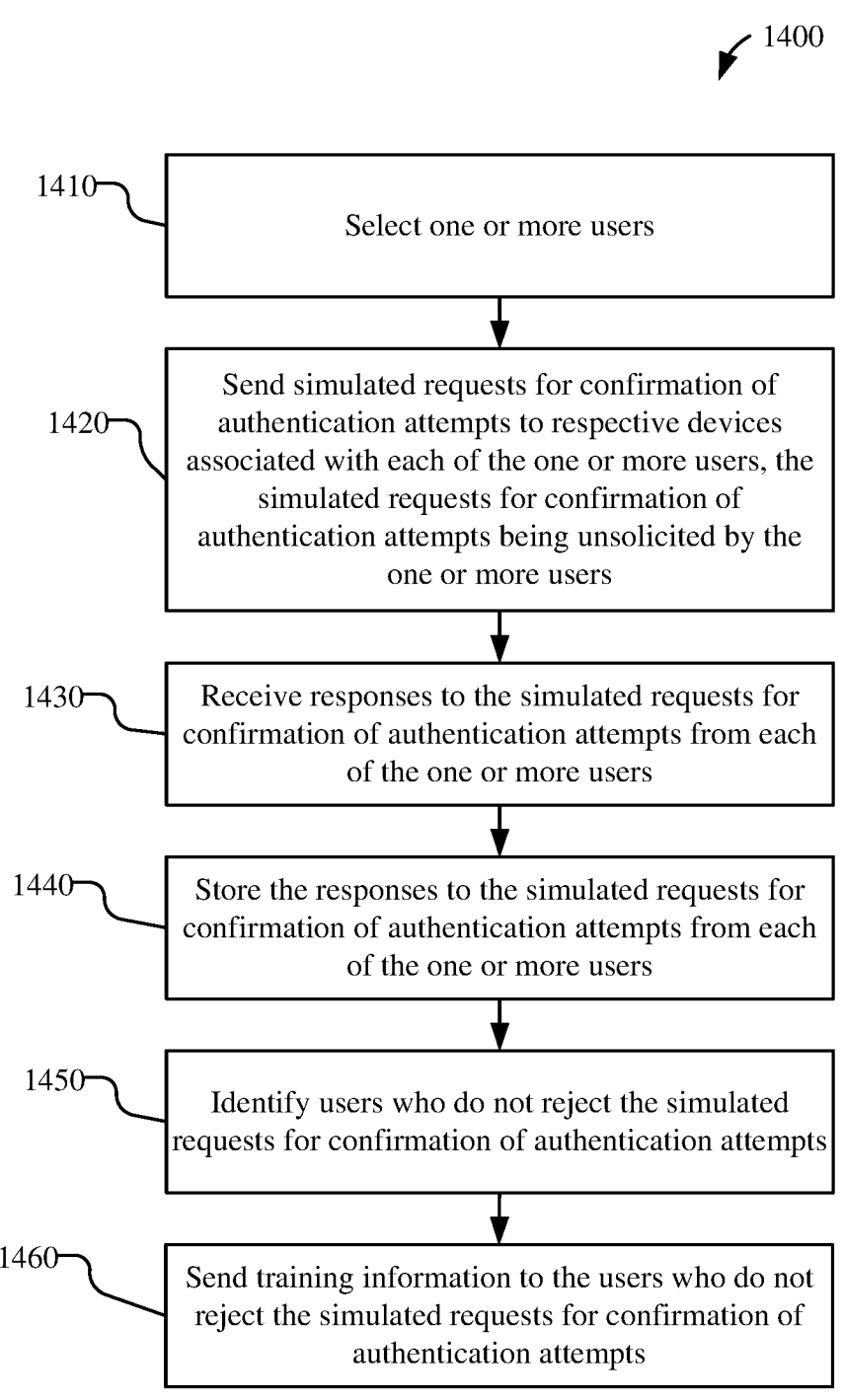
FIG. 14 is a flow chart illustrating a method for training users for a MFA Fatigue attack, in accordance with an implementation discussed herein.

FIG. 14 is a flow chart illustrating a method 1400 for training users for a Multi-Factor Authentication (MFA) Fatigue attack, which may be performed by a computer system, such as on server 106, shown in FIG. 1, or computer system 200, shown in FIG. 2. The method 1300, for example, may include one or more elements discussed in reference to FIG. 11.

At block 1410, the computer system may select one or more users, e.g., as discussed at 1110 in FIG. 11.

At block 1420, the computer system may send simulated requests for confirmation of authentication attempts to respective devices associated with each of the one or more users, the simulated requests for confirmation of authentication attempts being unsolicited by the one or more users, e.g., as discussed at 1120 in FIG. 11. In some implementations, the computer system may send the simulated requests for confirmation of authentication attempts to respective devices associated with each of the one or more users at scheduled times or at stochastically selected times, e.g., as discussed at 1120 in FIG. 11.

At block 1430, the computer system may receive responses to the simulated requests for confirmation of authentication attempts from each of the one or more users, e.g., as discussed at 1130 in FIG. 11.

At block 1440, the computer system may store the responses to the simulated requests for confirmation of authentication attempts from each of the one or more users, e.g., as discussed at 1130 in FIG. 11.

At block 1450, the computer system may identify users who do not reject the simulated requests for confirmation of authentication attempts, e.g., as discussed at 1140 in FIG. 11.

At block 1460, the computer system may send training information to the users who do not reject the simulated requests for confirmation of authentication attempts, e.g., as discussed at 1150 in FIG. 11.

In some implementations, the computer system may generate a report for the one or more users comprising at least one of a list of each user, details for each simulated requests for confirmation of authentication attempt sent to each user, the response of each user, details of historical performance of each user in prior simulated requests for confirmation of authentication attempts, e.g., as discussed at 1140 in FIG. 11.

In some implementations, the training information may include one or more of a performance review message, text, video, or audio, e.g., as discussed at 1150 in FIG. 11.

In some implementations, the computer system may further, select a subset of the one or more users based on the users who do not reject the simulated requests for confirmation of authentication attempts, send additional simulated requests for confirmation of authentication attempts to the respective devices associated with each of the users in the subset, receive responses to the additional simulated requests for confirmation of authentication attempts from each of the users in the subset, store the responses to the additional simulated requests for confirmation of authentication attempts from each of the users in the subset, identify users in the subset who do not reject the simulated requests for confirmation of authentication attempts, and modify an authentication procedure for the users in the subset who do not reject the simulated requests for confirmation of authentication attempts, e.g., as discussed at 1150 in FIG. 11. For example, in a normal mode of the authentication procedure a request for confirmation of authentication attempt is sent to a device associated with a user in response to a request for authentication for the user received from an initiating device, and modifying the authentication procedure may include requiring a verification that the initiating device is in possession of the user.

Those skilled in the art will understand that the preceding implementations of the present disclosure provide the foundation for numerous alternatives and modifications that are also deemed within the scope of the present disclosure. The above description is intended to be illustrative, and not restrictive. For example, the above-described examples (or one or more aspects thereof) may be used in combination with each other. Other implementations can be used, such as by one of ordinary skill in the art upon reviewing the above description. Also, various features may be grouped together and less than all features of a particular disclosed implementation may be used. Thus, the following aspects are hereby incorporated into the above description as examples or implementations, with each aspect standing on its own as a separate implementation, and it is contemplated that such implementations can be combined with each other in various combinations or permutations. Therefore, the spirit and scope of the appended claims should not be limited to the foregoing description.

What is claimed is:

1. A method for detecting a Multi-Factor Authentication (MFA) Fatigue attack, the method comprising:
  receiving a request for authentication for a user via an electronic interface in a Multi- Factor Authentication (MFA) process, the request for authentication comprising an identifier of the user, wherein in the MFA process each request for authentication requires the user to provide a confirmation of the request for authentication;
  determining if the request for authentication is part of an MFA Fatigue attack, in which repeated unauthorized requests for authentication are submitted, comprising:
    storing, in an electronic record, the request for authentication for the user including at least the identifier for the user and a time of the request for authentication for the user;
    determining a number of previous requests for authentication for the user received within a predetermined amount of time prior to the request for authentication for the user from the electronic record based on at least the identifier for the user and times of the previous requests for authentication for the user;
    determining that the request for authentication for the user is an MFA Fatigue attack if the number of previous requests for authentication for the user received within the predetermined amount of time is greater than a predetermined threshold number and cancelling pending requests for authentication and preventing subsequent requests for authentication if the request for authentication for the user is an MFA Fatigue attack; and
  proceeding with the MFA process for the user in which the user is required to provide confirmation of the request for authentication if the number of previous requests for authentication for the user received within the predetermined amount of time is not greater than the predetermined threshold number.

2. The method of claim 1, wherein an identifier for an originating device for the request for authentication for the user is stored with the request for authentication for the user, and wherein determining the number of previous requests for authentication for the user is further based on the originating device.

3. The method of claim 1, wherein at least one of the predetermined amount of time and the predetermined threshold number is configurable by the user or an administrator.

4. The method of claim 1, wherein at least one of the predetermined amount of time and the predetermined threshold number is configurable for individual users, groups of users, or all users within an organization.

5. The method of claim 1, wherein previous requests for authentication for the user included in the number of previous requests for authentication for the user comprises successful authentications, unsuccessful authentications, and indeterminate authentications.

6. The method of claim 1, further comprising indicating that the request for authentication for the user is an MFA Fatigue attack against an entity comprising one of only the user, a group of users that includes the user, or an organization that includes the user.

7. The method of claim 6, wherein the entity is configurable by the user or an administrator.

8. The method of claim 1, wherein after proceeding with the authentication process for the user, the method further comprises:
  receiving an indication from the user that the request for authentication for the user is unauthorized; and
  indicating that the request for authentication for the user is an MFA Fatigue attack.

9. The method of claim 1, wherein after proceeding with the authentication process for the user, the method further comprises:
  receiving an indication from an administrator that an entity comprising one of only the user, a group of users that includes the user, and an organization that includes the user is undergoing an MFA Fatigue attack; and
  indicating that the request for authentication for the user is an MFA Fatigue attack.

10. An authentication server for detecting a Multi-Factor Authentication (MFA) Fatigue attack, comprising:
  at least one memory; and
  a processing system comprising one or more processors coupled to and the at least one memory, the processing system configured to:
    receive a request for authentication for a user via an electronic interface in a Multi-Factor Authentication (MFA) process, the request for authentication comprising an identifier of the user, wherein in the MFA process each request for authentication requires the user to provide a confirmation of the request for authentication;

determining if the request for authentication is part of an MFA Fatigue attack, in which repeated unauthorized requests for authentication are submitted, comprising:

store, in an electronic record, the request for authentication for the user including at least the identifier for the user and a time of the request for authentication for the user;

determine a number of previous requests for authentication for the user received within a predetermined amount of time prior to the request for authentication for the user from the electronic record based on the at least the identifier for the user and times of the previous requests for authentication for the user;

determine that the request for authentication for the user is an MFA Fatigue attack if the number of previous requests for authentication for the user received within the predetermined amount of time is greater than a predetermined threshold number and cancelling pending requests for authentication and preventing subsequent requests for authentication if the request for authentication for the user is an MFA Fatigue attack; and proceed with the MFA process for the user in which the user is required to provide confirmation of the request for authentication if the number of previous requests for authentication for the user received within the predetermined amount of time is not greater than the predetermined threshold number.

11. The authentication server of claim 10, wherein an identifier for an originating device for the request for authentication for the user is stored with the request for authentication for the user, and wherein the processing system is configured to determine the number of previous requests for authentication for the user further based on the originating device.

12. The authentication server of claim 10, wherein at least one of the predetermined amount of time and the predetermined threshold number is configurable by the user or an administrator.

13. The authentication server of claim 10, wherein at least one of the predetermined amount of time and the predetermined threshold number is configurable for individual users, groups of users, or all users within an organization.

14. The authentication server of claim 10, wherein previous requests for authentication for the user included in the number of previous requests for authentication for the user comprises successful authentications, unsuccessful authentications, and indeterminate authentications.

15. The authentication server of claim 10, wherein the processing system is further configured to indicate that the request for authentication for the user is an MFA Fatigue attack against an entity comprising one of only the user, a group of users that includes the user, or an organization that includes the user.

16. The authentication server of claim 15, wherein the entity is configurable by the user or an administrator.

17. The authentication server of claim 10, wherein after proceeding with the authentication process for the user, the processing system is further configured to:

receive an indication from the user that the request for authentication for the user is unauthorized; and indicate that the request for authentication for the user is an MFA Fatigue attack.

18. The authentication server of claim 10, wherein after proceeding with the authentication process for the user, the processing system is further configured to:

receive an indication from an administrator that an entity comprising one of only the user, a group of users that includes the user, and an organization that includes the user is undergoing an MFA Fatigue attack; and indicate that the request for authentication for the user is an MFA Fatigue attack.

19. The method of claim 1, wherein the request for authentication comprising the identifier of the user further comprises a valid password.

20. The authentication server of claim 10, wherein the request for authentication comprising the identifier of the user further comprises a valid password.

* * * * *